(12) United States Patent
Gokturk et al.

(10) Patent No.: US 7,660,468 B2
(45) Date of Patent: Feb. 9, 2010

(54) SYSTEM AND METHOD FOR ENABLING IMAGE SEARCHING USING MANUAL ENRICHMENT, CLASSIFICATION, AND/OR SEGMENTATION

(75) Inventors: Salih Burak Gokturk, Mountain View, CA (US); Baris Sumengen, San Francisco, CA (US); Diem Vu, San Jose, CA (US); Navneet Dalal, Bangalore (IN); Danny Yang, Foster City, CA (US); Xiaofan Lin, Sunnyvale, CA (US); Azhar Khan, San Francisco, CA (US); Munjal Shah, Palo Alto, CA (US); Dragomir Anguelov, San Francisco, CA (US); Lorenzo Torresani, Cambridge (GB); Vincent Vanhoucke, Menlo Park, CA (US)

(73) Assignee: Like.com, San Mateo, CA (US)

( * ) Notice: Subject to any disclaimer, the term of this patent is extended or adjusted under 35 U.S.C. 154(b) by 0 days.

(21) Appl. No.: 11/936,713

(22) Filed: Nov. 7, 2007

(65) Prior Publication Data
US 2008/0144943 A1      Jun. 19, 2008

Related U.S. Application Data

(63) Continuation-in-part of application No. 11/777,894, filed on Jul. 13, 2007, which is a continuation-in-part of application No. 11/246,742, filed on Oct. 7, 2005.

(60) Provisional application No. 60/864,781, filed on Nov. 7, 2006, provisional application No. 60/909,414, filed on Mar. 30, 2007, provisional application No. 60/679,591, filed on May 9, 2005.

(51) Int. Cl.
    *G06K 9/62*   (2006.01)
    *G06F 7/00*   (2006.01)
    *G06Q 30/00*  (2006.01)

(52) U.S. Cl. ............... 382/224; 382/209; 382/305; 707/3; 705/27

(58) Field of Classification Search ............... None
    See application file for complete search history.

(56) References Cited

U.S. PATENT DOCUMENTS 5,781,650 A     7/1998   Lobo et al.

(Continued)

FOREIGN PATENT DOCUMENTS

JP         2006-119836     *  5/2006

OTHER PUBLICATIONS

U.S. Appl. No. 11/246,741, filed Oct. 7, 2005, Gokturk et al.

(Continued)

*Primary Examiner*—Charles Kim
(74) *Attorney, Agent, or Firm*—Mahamedi Paradice Kreisman LLP

(57) ABSTRACT

Embodiments described herein provide for a system for creating a data collection of recognized images. The system includes an image analysis module that is configured to programmatically analyze individual images in a collection of images in order to determine information about each image in the collection. The system may also include a manual interface that is configured to (i) interface with one or more human editors, and (ii) displays a plurality of panels concurrently. Individual panels may be provided for one or more analyzed images, and individual panels may be configured to display information that is at least indicative of the one or more images of that panel and/or of the information determined from the one or more images. Additionally, the manual interface enables the one or more human editors to view the plurality of panels concurrently and to interact with each of the plurality of panels in order to correct or remove any information that is incorrectly determined from the image of that panel.

18 Claims, 18 Drawing Sheets

U.S. PATENT DOCUMENTS

| | | | |
|---|---|---|---|
| 5,845,639 | A | 12/1998 | Hochman et al. |
| 5,982,912 | A | 11/1999 | Fukui et al. |
| 6,035,055 | A | 3/2000 | Wang et al. |
| 6,173,068 | B1 | 1/2001 | Prokoski |
| 6,556,713 | B2 | 4/2003 | Kobayashi et al. |
| 6,606,417 | B1 | 8/2003 | Brechner |
| 6,785,421 | B1 | 8/2004 | Gindele et al. |
| 6,801,641 | B2 | 10/2004 | Eraslan |
| 6,819,783 | B2 | 11/2004 | Goldberg et al. |
| 7,006,236 | B2 | 2/2006 | Tomasi et al. |
| 7,140,550 | B2 | 11/2006 | Ramachandran |
| 7,203,356 | B2 | 4/2007 | Gokturk et al. |
| 7,310,431 | B2 | 12/2007 | Gokturk et al. |
| 7,340,077 | B2 | 3/2008 | Gokturk et al. |
| 7,382,903 | B2 | 6/2008 | Ray |
| 7,519,200 | B2 | 4/2009 | Gokturk et al. |
| 7,542,610 | B2 | 6/2009 | Gokturk et al. |
| 2001/0033690 | A1 | 10/2001 | Berche et al. |
| 2002/0097893 | A1 | 7/2002 | Lee et al. |
| 2002/0103813 | A1 | 8/2002 | Frigon |
| 2002/0107718 | A1 | 8/2002 | Morrill et al. |
| 2002/0114522 | A1 | 8/2002 | Seeber |
| 2003/0028451 | A1 | 2/2003 | Ananian |
| 2003/0063779 | A1 | 4/2003 | Wrigley |
| 2003/0202683 | A1 | 10/2003 | Ma et al. |
| 2004/0264810 | A1 | 12/2004 | Taugher et al. |
| 2005/0078885 | A1 | 4/2005 | Ozaki et al. |
| 2005/0271304 | A1 | 12/2005 | Retterath et al. |
| 2006/0097988 | A1* | 5/2006 | Hong .................. 345/168 |
| 2006/0133699 | A1 | 6/2006 | Widrow et al. |
| 2006/0143176 | A1* | 6/2006 | Mojsilovic et al. ............ 707/6 |
| 2006/0173560 | A1 | 8/2006 | Widrow et al. |
| 2006/0227992 | A1 | 10/2006 | Rathus et al. |
| 2006/0251292 | A1 | 11/2006 | Gokturk et al. |
| 2006/0251338 | A1 | 11/2006 | Gokturk et al. |
| 2006/0251339 | A1 | 11/2006 | Gokturk et al. |
| 2006/0253491 | A1 | 11/2006 | Gokturk et al. |
| 2007/0003113 | A1 | 1/2007 | Goldberg |
| 2007/0081744 | A1 | 4/2007 | Gokturk et al. |
| 2008/0080745 | A1 | 4/2008 | Gokturk et al. |
| 2008/0082426 | A1 | 4/2008 | Gokturk et al. |
| 2008/0152231 | A1 | 6/2008 | Gokturk et al. |
| 2008/0177640 | A1 | 7/2008 | Gokturk et al. |
| 2008/0199075 | A1 | 8/2008 | Gokturk et al. |
| 2008/0212849 | A1 | 9/2008 | Gao |
| 2008/0212899 | A1 | 9/2008 | Gokturk et al. |
| 2009/0034782 | A1* | 2/2009 | Gering .................. 382/100 |
| 2009/0177628 | A1 | 7/2009 | Yanagisawa et al. |

OTHER PUBLICATIONS

U.S. Appl. No. 11/936,694, filed Nov. 7, 2007, Gokturk et al.
U.S. Appl. No. 11/936,705, filed Nov. 7, 2007, Gokturk et al.
U.S. Appl. No. 11/936,713, filed Nov. 7, 2007, Gokturk et al.
U.S. Appl. No. 11/936,734, filed Nov. 7, 2007, Gokturk et al.
Final Office Action dated Oct. 20, 2008 for U.S. Appl. No. 11/543,758, 7 Pages.
Final Office Action dated Aug. 11, 2008 for U.S. Appl. No. 11/246,741, 18 Pages.
International Preliminary Report on Patentability and Written Opinion of the International Searching Authority in Application PCT/US2006/018016, Oct. 16, 2008, 12 pages.
International Search Report and Written Opinion of the International Searching Authority in Application PCT/US06/38864, U.S.International Searching Authority, Oct. 14, 2008, 16 pages.
International Search Report and Written Opinion of the International Searching Authority in Application PCT/US07/83935, U.S.International Searching Authority, Aug. 18, 2008, 23 pages.
International Search Report and Written Opinion of the International Searching Authority in Application PCT/US06/18016, U.S.International Searching Authority, Jun. 17, 2008, 17 pages.
Non-Final Office Action dated Oct. 27, 2008 for U.S. Appl. No. 11/936,734, 7 Pages.
Non-Final Office Action dated Oct. 21, 2008 for U.S. Appl. No. 11/936,705, 18 Pages.
Non-Final Office Action dated Oct. 16, 2008 for U.S. Appl. No. 11/777,070, 10 Pages.
Non-Final Office Action dated Jun. 6, 2008 for U.S. Appl. No. 11/543,758, 13 Pages.
Non-Final Office Action dated Dec. 6, 2007 for U.S. Appl. No. 11/246,741, 31 Pages.
Non-Final Office Action dated Jun. 3, 2008 for U.S. Appl. No. 11/246,742, 16 Pages.
Tu, Zhuowen et al., "Image Parsing: Unifying Segmentation, Detection, and Recognition," Proceedings of the Ninth IEEE International Conference on Computer Vision (ICCV 2003), University of California, Los Angeles, CA 90095, 7 pages.
Yuille, A.L. et al, "Signfinder: Using Color to detect, localize and identify informational signs," Proceedings International Conference on Computer Vision, ICCV, 1998, Smith-Kettlewell Eye Research Institute, 2318 Fillmore Street, San San Francisco, CA 94115, 9 pages.
U.S. Appl. No. 12/395,422, filed Feb. 27, 2009, Gokturk et al.
U.S. Appl. No. 12/431,706, filed Apr. 28, 2009, Gokturk et al.
Final Office Action dated Jun. 16, 2009 for U.S. Appl. No. 11/936,705, 20 Pages.
International Preliminary Report on Patentability and Written Opinion of the International Searching Authority in Application PCT/US2007/083935, May 22, 2009, 20 pages.
International Preliminary Report on Patentability in Application PCT/US2006/038864, Nov. 27, 2008, 10 pages.
Non-Final Office Action dated Dec. 29, 2008 for U.S. Appl. No. 11/246,589, 19 Pages.
Non-Final Office Action dated May 28, 2009 for U.S. Appl. No. 11/246,434, 6 Pages.
Non-Final Office Action dated Oct. 27, 2008 for U.S. Appl. No. 11/246,434, 11 Pages.
Notice of Allowance dated Apr. 17, 2009 for U.S. Appl. No. 11/543,758, 14 Pages.
Notice of Allowance dated Dec. 22, 2008 for U.S. Appl. No. 11/246,742, 12 Pages.
Notice of Allowance dated Sep. 17, 2009 for U.S. Appl. No. 11/936,705 14 pages.
Notice of Allowance dated Oct. 1, 2009 for U.S. Appl. No. 11/936,734, 12 pages.

* cited by examiner

SYSTEM AND METHOD FOR ENABLING IMAGE SEARCHING USING MANUAL ENRICHMENT, CLASSIFICATION, AND/OR SEGMENTATION

RELATED APPLICATIONS

This application claims benefit of priority to U.S. Provisional Patent Application Ser. No. 60/864,781, filed Nov. 7, 2006, entitled AN IMAGE SIMILARITY SYSTEM, the aforementioned priority application being hereby incorporated by reference in its entirety.

This application is a continuation-in-part of U.S. patent application Ser. No. 11/777,894, entitled SYSTEM AND METHOD FOR ENABLING IMAGE RECOGNITION AND SEARCHING OF REMOTE CONTENT ON DISPLAY, filed Jul. 13, 2007, (i) which claims benefit to U.S. Provisional Patent Application No. 60/909,414, filed Mar. 30, 2007, entitled TECHNIQUE FOR ACTIVATING IMAGES ON WEBSITES IN ORDER TO ENABLE VISUAL SEARCH OF IMAGE PORTIONS BY WEBSITE USERS, the aforementioned priority applications being hereby incorporated by reference in its entirety; and (ii) which is a continuation-in-part of U.S. patent application Ser. No. 11/246,742, entitled SYSTEM AND METHOD FOR ENABLINIG THE USE OF CAPTURED IMAGES THROUGH RECONGITION, filed on Oct. 7, 2005; which claims benefit of priority to U.S. Provisional Patent Application No. 60/679,591, entitled METHOD FOR TAGGING IMAGES, filed May 9, 2005

This application also incorporates by reference in its entirety PCT Application PCT/US07/83935, filed Nov. 7, 2007.

TECHNICAL FIELD

The disclosed embodiments relate generally to the field of digital image processing.

BACKGROUND

Digital photography has become a consumer application of great significance. It has afforded individuals convenience in capturing and sharing digital images. Devices that capture digital images have become low-cost, and the ability to send pictures from one location to the other has been one of the driving forces in the drive for more network bandwidth.

Due to the relative low cost of memory and the availability of devices and platforms from which digital images can be viewed, the average consumer maintains most digital images on computer-readable mediums, such as hard drives, CD-Roms, and flash memory. The use of file folders are the primary source of organization, although applications have been created to aid users in organizing and viewing digital images. Some search engines, such as GOOGLE, also enables users to search for images, primarily by matching text-based search input to text metadata or content associated with images.

DETAILED DESCRIPTION

Figure 1:
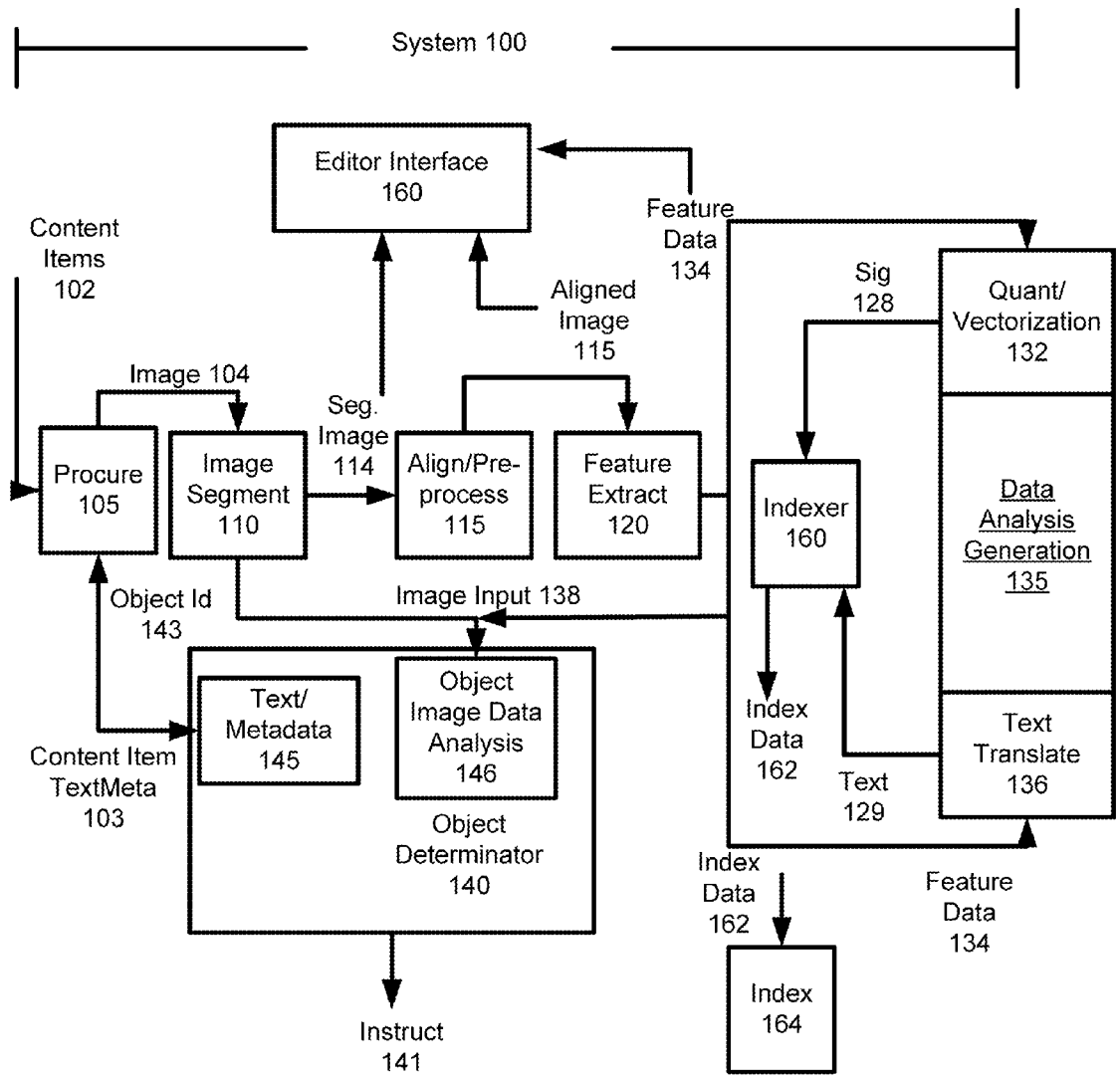
FIG. 1 illustrates a system for analyzing images of objects, under an embodiment of the invention.

Numerous embodiments are described herein for the use of digital images and photography. Embodiments described herein enable programmatic detection and/or identification of various types and classes of objects from images, including objects that are items of commerce or merchandise. Among the numerous embodiments described herein, embodiments include (i) systems and methods for detecting and analyzing images; (i) systems and methods searching for images using image data, text data, features, and non-textual data; (iii) user-interface and features thereof for enabling various forms of search on a collection or database of analyzed images; (iv) e-commerce applications for enabling visual, non-textual and visually aided searches of merchandise items; and (v) retrieval and analysis of images from third-part y sites and network locations. Embodiments described herein further include components, modules, and sub-processes that comprise aspects or portions of other embodiments described herein.

Embodiments described herein provide for a system for creating a data collection of recognized images. The system includes an image analysis module that is configured to programmatically analyze individual images in a collection of images in order to determine information about each image in the collection. The system may also include a manual interface that is configured to (i) interface with one or more human editors, and (ii) displays a plurality of panels concurrently. Individual panels may be provided for one or more analyzed images, and individual panels may be configured to display information that is at least indicative of the one or more images of that panel and/or of the information determined from the one or more images. Additionally, the manual interface enables the one or more human editors to view the plurality of panels concurrently and to interact with each of the plurality of panels in order to correct or remove any information that is incorrectly determined from the image of that panel.

One or more embodiments enable image analysis of content items that include image. Among other applications, the analysis of such content items (including images or images with text and/or metadata) enables the use of content or image based searching. In one embodiment, a search query may be derived from image data, or values for image data.

As used herein, the term "image data" is intended to mean data that corresponds to or is based on discrete portions of a captured image. For example, with digital images, such as those provided in a JPEG format, the image data may correspond to data or information about pixels that form the image, or data or information determined from pixels of the image. Another example of "image data" is signature or other non-textual data that represents a classification or identity of an object, as well as a global or local feature.

The terms "recognize", or "recognition", or variants thereof, in the context of an image or image data (e.g. "recognize an image") is meant to means that a determination is made as to what the image correlates to, represents, identifies, means, and/or a context provided by the image. Recognition does not mean a determination of identity by name, unless stated so expressly, as name identification may require an additional step of correlation.

As used herein, the terms "programmatic", "programmatically" or variations thereof mean through execution of code, programming or other logic. A programmatic action may be performed with software, firmware or hardware, and generally without user-intervention, albeit not necessarily automatically, as the action may be manually triggered.

One or more embodiments described herein may be implemented using programmatic elements, often referred to as modules or components, although other names may be used. Such programmatic elements may include a program, a subroutine, a portion of a program, or a software component or a hardware component capable of performing one or more stated tasks or functions. As used herein, a module or component, can exist on a hardware component independently of other modules/components or a module/component can be a shared element or process of other modules/components, programs or machines. A module or component may reside on one machine, such as on a client or on a server, or a module/component may be distributed amongst multiple machines, such as on multiple clients or server machines. Any system described may be implemented in whole or in part on a server, or as part of a network service. Alternatively, a system such as described herein may be implemented on a local computer or terminal, in whole or in part. In either case, implementation of system provided for in this application may require use of memory, processors and network resources (including data ports, and signal lines (optical, electrical etc.), unless stated otherwise.

Embodiments described herein generally require the use of computers, including processing and memory resources. For example, systems described herein may be implemented on a server or network service. Such servers may connect and be used by users over networks such as the Internet, or by a combination of networks, such as cellular networks and the Internet. Alternatively, one or more embodiments described herein may be implemented locally, in whole or in part, on computing machines such as desktops, cellular phones, personal digital assistances or laptop computers. Thus, memory, processing and network resources may all be used in connection with the establishment, use or performance of any embodiment described herein (including with the performance of any method or with the implementation of any system).

Furthermore, one or more embodiments described herein may be implemented through the use of instructions that are executable by one or more processors. These instructions may be carried on a computer-readable medium. Machines shown in figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on many cell phones and personal digital assistants (PDAs)), and magnetic memory. Computers, terminals, network enabled devices (e.g. mobile devices such as cell phones) are all examples of machines and devices that utilize processors, memory, and instructions stored on computer-readable mediums.

System for Analyzing Content Items Carrying Images

FIG. 1 illustrates a system for analyzing images of objects, under an embodiment of the invention. A system such as shown and described by an embodiment of FIG. 1 may include applications such as enabling search and retrieval, and/or enabling display of programmatically determined information. As described with other embodiments herein, a system such as described with an embodiment of FIG. 1 may be used to enable an e-commerce system that enables use of image analysis, including image-to-image searching.

In an embodiment, a system 100 is provided for analyzing content items that carry images. The system includes modules in the form of procurement 105, image segmentizer 110, feature extraction 120, and analysis data generation 135. According to embodiments, system 100 may operate on content items 102 that include images, including records or web content that package images along with text and/or metadata. Specific examples of content items 102 for use with embodiments described herein include web content, such as provided for merchandise, or web pages (e.g. e-commerce sites, blogs) on which people or merchandise are displayed. Other content items include images that may be uploaded by persons.

In performing various analysis operations, system 100 may determine and/or use information that is descriptive or identifiable to objects shown in the images of the content items. Accordingly, system 100 may analyze content items 102 by (i) recognizing or otherwise determining information about an object contained in an image of the procured content item, through an analysis of image data, text data, metadata or any combination thereof, and/or (ii) recognizing or otherwise determining information about an object using existing or known information from a source other than the content item. The information about the object contained in the image may correspond to one or more classifications (e.g. "Men's apparel", "clothing", sunglasses"), determination of type (e.g. manufacturer or brand identification), attribute information (color, pattern, shape), and/or information that is sufficiently specific to identify the object (such as for purchase). In order to programmatically determine information about the object contained in the image of a given content item 102, one or more embodiments may employ object determinator 140, which may determine the information about the object(s) in the image of a given content item 102 using image analysis and recognition, text analysis, metadata analysis, human input, or a combination thereof. In this way, the object determinator 140 may use both information determined from the source, and existing or known information from a source other than the content item.

Figure 4A:
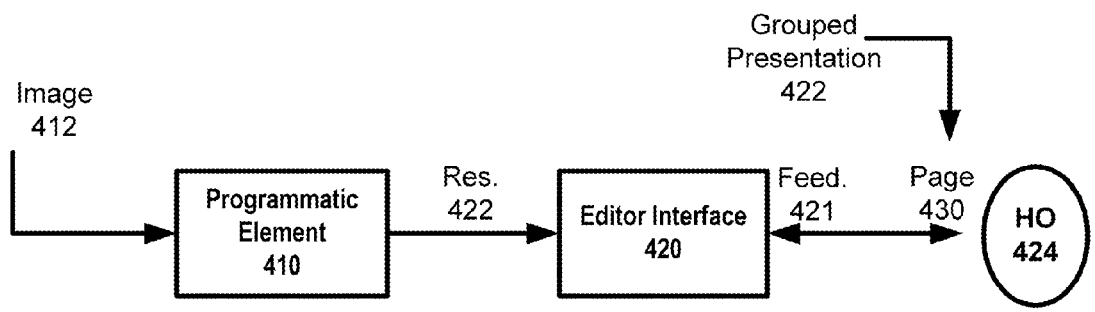
FIG. 4A illustrates a manual enrichment process, according to an embodiment of the invention.
Figure 4B:
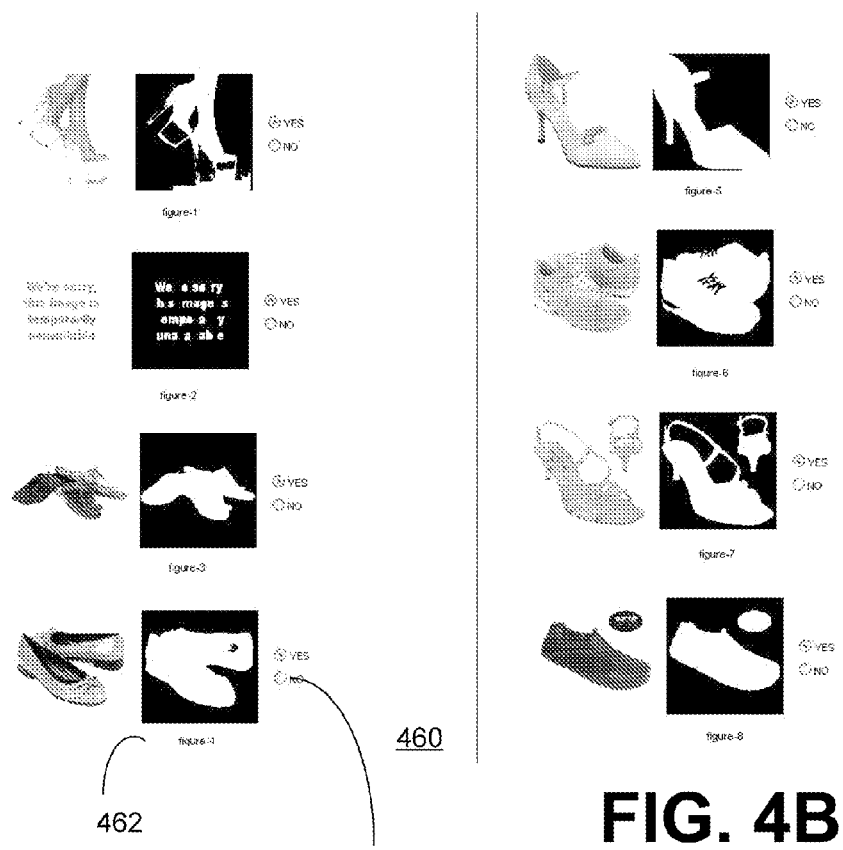
FIG. 4B illustrates a manual enrichment process performed on results of segmentation process, such as performed by an image segmentizer component of another embodiment described herein, according to one or more embodiments of the invention.

One or more embodiments also contemplate use of a manual enrichment to enhance the accuracy of individual components and/or the system 100 as a whole. Accordingly, an embodiment includes an editor interface 160 for enabling manual confirmation of programmatically determined information, as well as manual editing or correction. FIG. 4A and FIG. 4B illustrate how manual enrichment and/or editor interface 160 may operate, according to one or more embodiments of the invention.

More generally, in one embodiment, system 100 handles images that are generated independently of the system, so that the system has limited advance knowledge about what the contents of the images are, or what form or formatting is used in conveying objects shown in the images (e.g. alignment, image formatting). Alternatively, the system may operate on a collection or library where some knowledge of the contents of the images is known in advance. This knowledge may be provided by, for example, human operators. For example, specific online merchants may be known to sell products of a specific category, or products at a particular site may be known to be of a particular classification when displayed under a specific tab. Human operators may provide this information in advance.

Procurement 105 may perform anyone of many processes to procure content items 102 that contain unprocessed images. In one implementation, procurement 105 may crawl network locations to locate web files, including files that contain images. In another implementation, procurement 105 may interface or receive feeds from a library of collection of content item 102. Still further, procurement 105 may receive triggers to access other sites or network locations, and/or handle uploads or content item submissions from users.

Content items 102 may include files or portions thereof that contain images (exclusively, or in combination with other data). In one embodiment, content items 102 correspond to image files, combination of text/image files, or to portions of records or pages (e.g. web pages) that contains images (and possibly text). Content items 102 may also contain metadata, which includes tags or other data that may not necessarily form part of the displayed content of the content item. The output of procurement 105 includes images 104, and possibly pertinent text.

Figure 2:
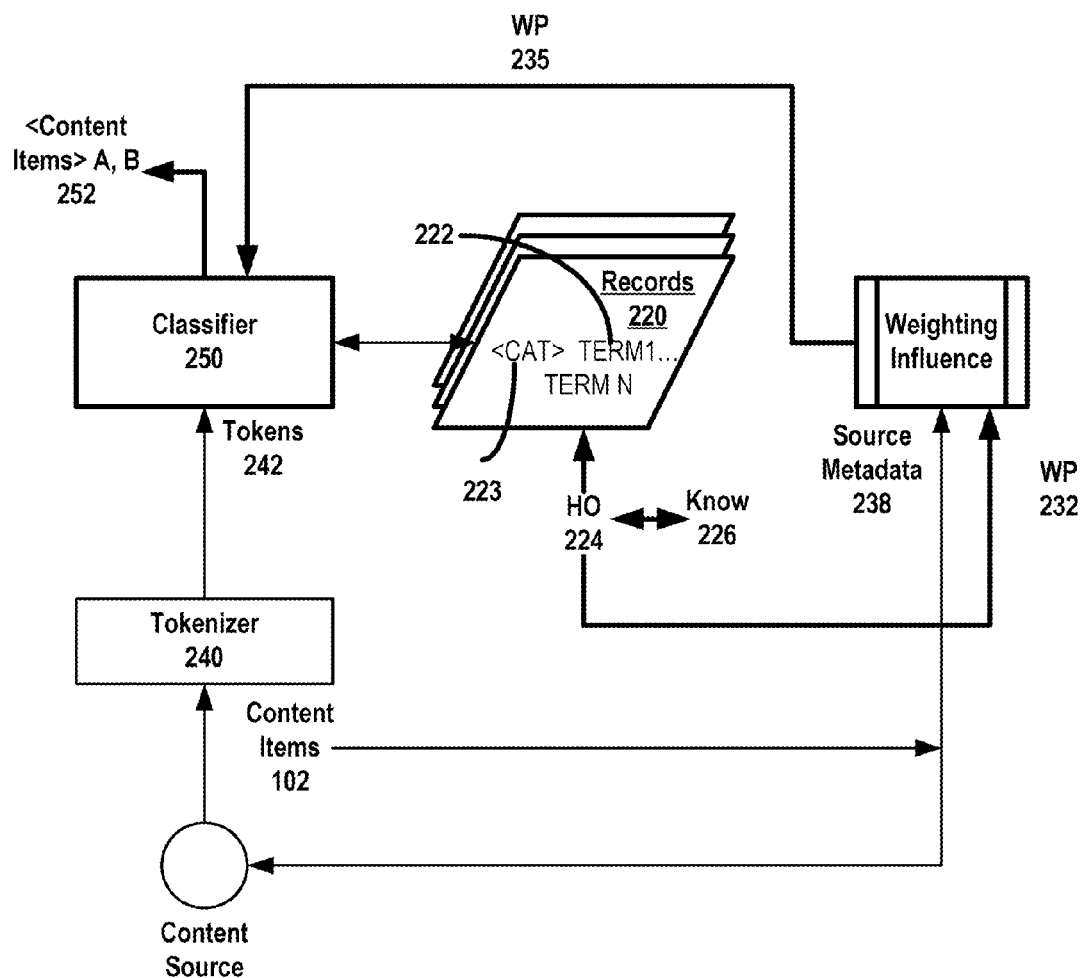
FIG. 2 illustrates a category-mapping system for enabling human operators to facilitate a system such as described in FIG. 1, according to an embodiment of the invention.

Embodiments provide that system 100 attempts to determine information about objects identified in content items 102 before or independent of image recognition/analysis processes are performed. In one embodiment, procurement 105 extracts text and metadata 103 from content item 102. The text and metadata 103 are forwarded to the object determinator 140. A text and metadata analyzer 145 may determine an object identifier 143 for an object contained in the content item. The object identifier 143 may correspond to an identification of a class or type, although other information may also be determined. In one embodiment, the text and metadata analyzer 145 portion of the object determinator 140 determines as much information as possible from the text and metadata 103. For example, in the case where content item 102 includes a web-based record of a shoe (e.g. as an item for merchandise), the text and metadata analyzer 145 may use the text and metadata to determine various levels of classification about the shoe, including whether it is for men or women, the type of shoe (sneakers, dress shoes, sandals), its coloring, price range, manufacturer, its quality (e.g. sample ratings provided on a website where the shoe is provided for sale), the material used to manufacture the shoe, and various other information. When such detailed information is not available, the text and metadata analyzer 145 may use the text and metadata 103 to perform an analysis on the content item 102, in order to identify hints or clues as to the object of the content item 102. Such analysis may correspond to, for example, key word identification of the text of the content item, as well as metadata associated with the source of the content item 102. The metadata may correspond to the domain, or a category, specification or attribute associated with the content item. FIG. 2 illustrates a more detailed description of how the text and metadata analyzer 145 of the object determinator 140 may be used, under one or more embodiments of the invention. In another embodiment, the object image data analysis 146 can be used in conjunction with text and metadata information.

The image segmentizer 110 may receive the image content 104 of the content item 102 from procurement 105. The image segmentizer 110 segments the image content into a foreground image and a background image, with the foreground image corresponding to a segmented image 114. As mentioned, one or more embodiments provide that procurement 105 receives or uses hints or a priori knowledge in segmenting an segmented image 114 from the background (e.g. such as through text, metadata and/or human provided knowledge). Thus, for example, the image segmentizer 110 may know to segment an image to separate a shoe, neck tie, or other object from a background.

Moreover, one or more embodiments provide that the image segmentizer 110 may segment foreground objects from other foreground objects. For example, image segmentizer 110, in the case where the image contains a man wearing a suit in a street, image segmentizer 110 may separate the neck tie and the suit jacket and the person wearing a suit separately, all from a background that shows the street.

The image segmentizer 110 may implement any one of many foreground/background segmentation algorithms. One embodiment provides that for a given image 104, a background is assumed to be at the sides of the images, whereas the foreground can be assumed to be at the center. The intensity distribution of both foreground and background can be obtained from the center and side pixels respectively. As an example, a mixture of Gaussian models can be learnt for the foreground and background pixels. Such models can be applied to the whole image and each pixel can be classified as foreground and background. As an addition or alternative, the foreground and background can be determined by doing a statistical analysis of pixel distributions on the image, such as shown and described with a method of FIG. 2.

Under one embodiment, the segmented image 114 that is outputted from the image segmentizer 110 is subjected to an alignment process 115. The alignment process 115 may perform functions that normalize the alignment of the segmented image 114. Normalizing the segmented image 114 may facilitate analysis of the image (e.g. recognition of its attributes) and/or the presentation of panels or other content containing the segmented image 114 in some processed form.

According to an embodiment, the output of either of the image segmentizer 110 or the alignment process 115 may be provided to feature extraction 120.

Feature extraction 120 may detect or determine features of either the segmented image 114, or a normalized segmented image 115. Data provided as a result of the feature extraction 120 ("feature data 134") may include data that descriptive of particular aspects or characteristics of segmented image 114, as well as of the segmented image 114 as a whole. Certain features may be extracted that are class-specific descriptors that apply to the image object as a whole, such as primary color, patters, shape, and texture. Features that apply to the segmented image 114 as a whole may be referred to as "global features". One or more embodiments also provide that feature extraction 120 determines "local features", meaning those features that are localized to a specific part or portion of the segmented image 114. Under one implementation, global feature may be extracted from the overall image and segmentation mask. Local features may be extracted by dividing the overall image into sub-regions, and then detecting some or all of the features in each sub-region. Local features may also be extracted by identifying and/or compiling characteristics of key points or regions on the image.

Various embodiments described herein also provide for obtaining sub-regions in an image. In one embodiment, the image can be divided uniformly into sub-regions. In another embodiment, regions of key-points can be used to obtain the sub-regions. As an example, but without any limitation, corner points, or homogenous blobs can be used as key points in an image. In another embodiments, the regions can be selected by random sampling on the image. In yet another embodiment, a preliminary segmentation algorithm can be executed on the image, and output resulting regions of segmentation can be used as sub-regions. In addition to determining/detecting class-specific global and local features, one or more embodiments provide that the feature extraction can, for some types of objects, determine features that are specific to a sub-class or even unique to a particular object. For example, feature extraction may identify features that uniquely identify a hand-woven carpet, or even a face.

As described with another embodiment, global and local features are used for different types of visual search processes for an item. In the global case, a search process may seek to match an overall appearance of an object to a specific feature that is provided in the search input. In the local case, a search process may seek a match of an object that has similar characteristics in a selected or specific area.

The detection and determination of features (global and local) may be represented either quantifiably or by text. Analysis data generator 135 may include components (vector generator 132 and text translator 136) for recording both kinds of data. Quantifiable data may take the form of vectors, for example, which carry values that identify or are descriptive of various features. The vector generator 132 may use detected features represented by feature data 134 to generate a vector representation of a set of features for a particular object item. The vector representation may comprise one or more signatures 128, which may be generated for a particular segmented image 114. One segmented image 114 may have multiple signatures 128, for one or more local features and/or global features, or alternatively one signature 128 that is representative of the one or more local and/or global features. The signature(s) 128 of a particular image object may identify the given object (or a portion of an object) either uniquely or by a set of class-specific characteristics. A uniquely identified object may have a unique pattern, be handmade or even be a face of a person or animal. Additionally, signatures may be descriptive of both local and global features.

One or more embodiments include a text translator 136 that converts class-specific feature data 134 (or signatures 128) into text, so that local and/or global features may be represented by text data 129. For example, an extracted global feature may be converted into text data that is descriptive of the feature. In one embodiment, certain global features, such as a primary color, may be determined by value, then converted into text. For example, if the primary color is determined to be a hue of orange, the text translator 135 may convert the feature extraction 134 into the text "orange" and assign the text value to a field that is designated for the type of feature. Processes and algorithms for performing feature extraction and vectorization or quantification are described in greater detail below, including with FIG. 7-10.

Both signatures 128 and text data 129 may be provided to an indexer 160, which generates index data 162 for use with one or more indexes 164. The index data 162 may thus carry data that is the result of recognition or image analysis processes. Subsequent searches may specify or use image data provided in the one or more indexes 164.

Under an embodiment, the object determinator 140 may include an image analysis component 146 for analyzing image data, as provided by any of the other modules, in order to determine information that may suffice as the object identifier 143, in the absence of adequate text or metadata 103. The image analysis component 146 may use image input, corresponding to the output of one or more of the image segmentizer 110, alignment process 115, and/or feature extraction 120. The image analysis component 146 may operate on either pixilated data or quantified data, such as determined by quantification/vectorization component 134. For example, under one usage or embodiment, text and metadata 103 may be analyzed by the text analysis component 145 to determine object identifier 143 in the form of a general category of the object carried in the content item 102. This may be performed even before segmentation is initiated, or alternatively after some or all of the image processing steps are performed, in order to generate a label or classification for objects in the images of the content items. For example, some shape recognition process may be performed on the result of the aligned image 115 to classify the object as a "shoe". Once classified, such an embodiment enables the feature extraction 120 to look for features that are specific to shoes, such as heels, or straps. As an alternative or addition, the shape recognition process may be executed on the image data output from the image segmentizer 110, so that the desired alignment angle of the object may be determined from the image. In another embodiment, the image information can be used in conjunction with the text and metadata information. As an example, but without any limitation, a classifier can be built, such as nearest neighbor classifier, support vector machines, neural networks or naïve bayes classification. As a first step, a training set of items with corresponding categories is obtained. Then, any of the aforementioned classifier is built using any combination of metadata and image content information. A new input item is classified using the learnt classifier.

With programmatic elements such as described with object determinator 140, system 100 is capable of analyzing at least some content items 102 on sources that carry very little information about what objects were originally provided with the content item. For example, content item 102 may correspond to a web page of a blog about an individual or a topic such as fashion, and the person maintaining the web page may lack descriptive text on the image carried on the page. In such cases, object determinator 140 may operate off an image output (segmented image 114, normalized image object 115, feature data 134) to programmatically determine information about objects in the image. This may include identification of objects by type or classification, detection of the presence of faces or persons, and even the possible identification of persons in the image. Additionally, presence detection may be implemented for multiple features, where the detection of one feature serves as the marker for detection of another feature. For example, a person may be detected from a marker that corresponds to a face, leading to detection of the persons' legs, and then his or her shoes.

For such images, one embodiment provides that the object determinator 140 may use text and metadata to identify hints from surrounding text that are not explicitly descriptive or readily associated with the image of the content item. Such text and metadata, provided with or in association with the content item, may facilitate or confirm a determination of the object identifier 143 by the image data analysis 146. In one implementation where object identifier 143 is not readily determinable from text and metadata 103, the image data analysis 146 may run assumptions to determine if any assumption correlates to image data 138 (with or without text and metadata 103). For example, in the case where the blog includes the name of a celebrity, the object image data analysis 146 may seek (i.e. run assumptions) foreground shapes that correspond to clothing, such as shirts, pants and shoes, to see if any provide a general match. As an alternative of addition, the object determinator 140 may seek faces or other readily detectable objects, and exclude or further use these objects to confirm identification of objects contained in the content item 102.

In one embodiment, the object image data analysis can be made fully automated to search for clothing and apparel items in an image. This may include steps comprising some or all of (i) Face detection, (ii) Clothing segmentation (using the face location as a hint, and via removal of skin) (iii) Getting a confidence metric related to how well the segmentation is, (iv) Using a similarity matching based on high-confident clothing regions.

As a first step, the image is analyzed to find people in the image. Face detection algorithms can be used as part of this step. Suitable face detection algorithms for use with embodiments described herein are described in U.S. patent application Ser. No. 11/246,742, entitled SYSTEM AND METHOD FOR ENABLING THE USE OF CAPTURED IMAGES THROUGH RECOGNITION, filed on Oct. 7, 2005. An output of the face detection algorithms include identification of the locations of faces in the image. As a next step, the locations of the face and the eye are used as a prior to find the location of the clothing of the person.

It is generally known that the location of the upper-body-clothing is certain distance below the face. Using this, one can start a region growing based segmentation algorithm starting from a box roughly located around the center of the upper torso. As an example, but without any limitation, the location of the center of the upper torso can be determined based on the face location, and face size. The region growing segmentation algorithm should also take skin color into account. The skin color can be learnt via generic skin model obtained over a large set of people dataset, or it can be learnt using the face location of the particular person. More specifically, the color distribution around the face location is assumed to be the skin color distribution, and the pixels of such distribution would be excluded from the clothing region segmentation. Such a step would accomplish removal of a hand when a person puts it in front of the clothing. In one embodiment, a region growing segmentation algorithm can be used for segmenting the clothing. In another embodiment, a fixed size oval can be used to select the clothing location. In yet another embodiment, any embodiment of segmentation, such as matting or box-segmentation as described below can be used. In this case, the location of face is used to automatically generate a surrounding box to start the segmentation. In such embodiments of the segmentation, skin color is optionally detected and rejected from the segmented clothing region.

Once the clothing is segmented, a confidence score is associated with the clothing segmentation. This is necessary, mostly because some of the segmentations is not very useful for further processing. More specifically, they can be too small, or they can belong to people that are standing very close to each other so that the clothing of two people are segmented together. The confidence metric can be a function of many things, including the size of the clothing region, how many faces there are in the image, the smoothness and uniformity of color in the segmented region, the gender of the person (which can be detected by means of a gender classifier), and existence and locations of other regions and faces in the picture. Once a confidence is associated for each clothing region, the high confident regions can be selected for further processing.

Once the regions are selected, a similarity search is applied towards an index of 164, as part of a search 1260 as also described in the following sections.

In various locations of system 100, results determined programmatically may be enhanced through manual enrichment. Accordingly, one or more embodiments provide for the editor interface 160 to interface with results of more than one modules or processes, for purpose of enabling a manual operator to manually confirm or reject results. As described with embodiments of FIG. 4A and FIG. 4B, the editor interface 160 may enable the individual editor to confirm/reject results in groupings.

Classification and Determination of Object Identifier Information

FIG. 2 illustrates a category-mapping system for enabling human operators to facilitate a system such as described in FIG. 1. An embodiment such as shown by FIG. 2 may use text and metadata of individual content items 102 to determine information about objects contained in the images of a content item. The determined information may include, for example, object identifier information 143 (see FIG. 1), which identifies an object of the content item 102 by one or more classifications. Thus, the text and metadata of content items 102 may be used to determine information about the nature of objects represented in the images of the content items.

One or more embodiments use human operators 224 and knowledge 226 to generate a reference list of words and phrases that identify or are used typically in association with content items of a particular classifier. For example, humans who are experts in fashion may tag or associate merchandise items of fashion with new buzzwords and associations. These associations may be maintained in an ongoing list that comprises the knowledge 226. The knowledge 226 may thus provide words or phrases from which reference records 220 representing classifications may be defined. As described below, the reference record 220 may further include weights and other factors for enabling programmatic classification based on the list of words or phrases 222 contained in each record. The reference list of words or phrases may be incorporated into reference records 220 as a definition or partial definition of a corresponding category or classification. In this way, each reference record 220 may define one or more corresponding categories or classifications.

In the case of an e-commerce environment, for example, the descriptive words used for merchandise items may vary based on editorial variations of the different sources of the content items. This editorial variation may depend in part on the nature of the source and/or its target audience. A site that targets merchandise for teenage girls, for example, may refer to "sneaks" or "sneeks" for athletic footwear, while sites for other audiences may use "athletic footwear for women". With such considerations, one or more embodiments provide that a given category (e.g. "woman's athletic footwear") is associated with one or more corresponding reference records 220. Each of the reference records 220 define the corresponding category using words or phrases 222 that human operators 224 determine are descriptive of a corresponding category or classification 223. For example, "open toe", "airy", "strappy" and "leather bands" may all be mapped in one record to the classifications of "woman's footwear" and "sandals". The knowledge database 226 may maintain lists and associations that are built by the human operators 224 over time, for purpose of recalling that certain phrases or words are indicative of a particular classification.

Operators 224 that create a category-specific reference record 220 may leverage instances where specific words/phrases are relatively unique to one category, and that such words or phrases differentiate one domain from another domain. Operators 224 may also recognize that some words may be common to multiple categories. The human operators 224 and/or knowledge 226 may also identify words/phrases that are common to the demographic of the category (e.g. the demographic of people interested in "woman's athletic footwear"). Examples of such classification include gender and age.

In one embodiment, human operators 224 assign weights 232 for contributions of individual word/phrases, based on an understanding developed by the human operator as to the vocabulary used by the demographic that is associated with a particular category or classification. The weights 232 may be provided before runtime as input to the weighting influence 230. The weighting influence 230 may use the weights 232 to generate weighting parameters 235 for the text and metadata of individual content items at time the content items 102 are assigned to a category 223 (see below). The weights 232 may reflect the meaning or importance of individual words, and as such, may be provided by human operators 224 who are familiar with trends in how vocabulary is used over time. The use of weights 232 recognizes that words or phrases in one site have different significance or meanings than words or phrases at other sites.

In determining objected identification 143, content items containing images, text and/or metadata may be programmatically analyzed and categorized. The weighting influence 230 may receive or extract associated metadata 238 (or text) from a source 201 of the content item 102 and/or the content item itself. The weighting influence 230 may assign the weights 232 to different fields of the metadata 238 that is retrieved from source 201, such as metadata that identifies a brand or a network site where the content item is provided. The assigned weights 232 may then be processed for the metadata 238 to generate the weighting parameters 235, in a manner described below.

In an embodiment, the content items 102 are initially processed by tokenizer 240. The result of processing content items 102 includes generating tokens 242 from individual content items 102 that include words and phrases contained in the text and/or metadata of the content item 102. The tokens 242 of individual content items 102 are forwarded to a categorizer 250. The categorizer 250 may use reference records 220 and perform one or more processes to select which reference record 220 provides the best definition or definitions of categories. In one implementation, the classifier 250 determines an overall matching score to one or more of the records. The score may be influenced by presence of words that are unique to one category, versus words or phrases that are associated with multiple categories. In addition, weighting influence 230 may include weighting parameters 235 that take into account metadata 238 from the source 201 of the content item. The metadata 238 includes identification (by human operators 224) of the gender or demographic of the network site where the content item is located, as well as classifications made by the source of the content item (e.g. item provided in a particular labeled tab). The classifier 250 is able to identify one or more classifications 252 (or candidate categories) based on the combination of the tokens 242 as matched to reference records 220, and the influence of the weighting parameters 235 provided from metadata 238 (and pre-defined by the human operators 224). The categorizer 250 makes determinations as to classifications 252 that are to be assigned to each content item 102, or portions of individual content items 102. In another embodiment, the image content can be used in addition to the metadata for object categorization purposes. In this case, the algorithm would also justify its result with the look in the image, i.e. this image looks like a shoe or this image looks like a watch etc.

As an option, one or more embodiments include a manual editor interface 260 that enables human operators to perform manual enrichment. The interface 260 may display classifications 252, along with image portions of the content item, to human operators. In one embodiment, the display of the content item images and the identified classifications are made in cascade, enabling the human operators to specify which of the determinations are not correct.

Figure 3:
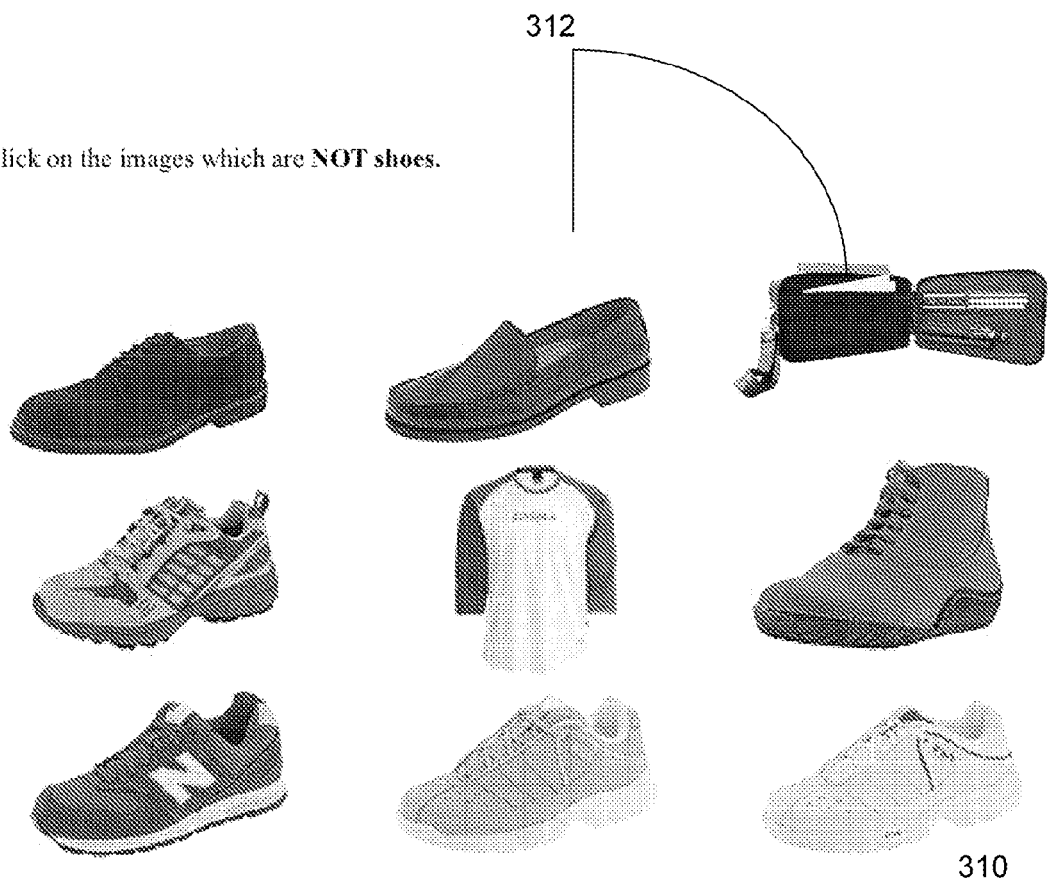
FIG. 3 illustrates implementation of the editor interface, under an embodiment of the invention.

FIG. 3 illustrates implementation of the editor interface 260, under an embodiment of the invention. The editor interface 260, and resulting implementation shown by FIG. 3, are illustrative of the manual enrichment component as a whole. The manual enrichment process is described with an embodiment of FIG. 4. As shown by an embodiment of FIG. 3, a page 310 of items 312 may be displayed to an operator. The page 310 may be assigned to a particular domain (category). As an example, once the algorithm assigns all the "women's shoes", images that are assigned are shown all together in a page, and the editor confirms that each one of these choices is correct. In one embodiment, the confirmation is in the form of rejecting incorrect determinations.

As an alternative or addition, one or more embodiments may utilize machine learning techniques when applying classification determination (i.e. domain mapping). Under one embodiment, groundtruth data is collected that has shopping items annotated with the domain that contains those shopping items. Machine Learning techniques like naïve bayes, logistic regression, and support vector machines can be used to learn a classification model for domain mapping. The classification model can be learned separately over each metadata field. Subsequently, a linear or non-linear combination of weights may be used to combine predictions from the different fields. A single classification model over all the metadata fields can also be learned.

A learning and prediction phase of the classifier 250 may be employed. The learning and prediction phase may use words that are weighted by parameters that are based on the inverse document frequency (IDF). Alternatively, words or phrases collected by human operators 224 may be used by the learning and prediction phase. Methods like naïve bayes learn the prior probabilities of the domain and the conditional probabilities of the word given the domain. By Bayes rule and conditional independence assumption of the word sequence, the learned probabilities are used to predict the conditional probability of the domain given the words in the metadata. The domain with the highest conditional probability is assigned as the target domain for the item.

Methods like support vector machines learn a maximum margin classifier in a sparse high dimensional space where the words in the metadata form the dimensions of the space. In the prediction phase, the item's metadata is converted to the high dimensional feature space. The position of this point in the high dimensional space with respect to the learned classifier boundary determines the domain.

As illustrated by an embodiment of FIG. 3, an embodiment provides for performance of manual enrichment by showing humans a cluster or grouping of items mapped to a particular domain. Human operators 224 may readily "eye-ball" the results and quickly remove incorrect mappings if any. In one embodiment, a full page of items that are assigned to a particular domain (category). As an example, once the algorithm assigns all the "women's shoes", images that are assigned are shown all together in a page, and the user is asked to confirm that each one of these choices is correct. As such, embodiments recognize that it is much faster to ask the human a page of items as opposed asking for verification on each item one by one.

Manual Enrichment

The results of programmatic processes such as described with a system of FIG. 1 may have a degree of error associated therewith. Recognition and analysis of content items carries a certain inherent error. One or more embodiments recognize the inherent error, and enhance results of programmatic processes with manual enrichment.

FIG. 4A illustrates a manual enrichment process, according to an embodiment of the invention. A programmatic element 410 may obtain results 422 corresponding to images 412 analyzed by any process or component described herein, including with an embodiment of FIG. 1. These results 422 may be provided to an editor interface 420. The editor interface 420 may display result groupings 422, which displays the results 422 of the element 410 in a grouped presentation 430. A human editor 424 may provide feedback 421 that includes confirmation and/or rejection of individual results provided with the grouped presentation 430. The editor interface 420 may convey the feedback 421 to rectify and/or filter the results of the programmatic element 410.

As an example of how one or more embodiments may be implemented, individual results of the element 410 may be represented with panels that include an image and possibly a descriptive text element that conveys the result to a human operator 424. In providing the result groupings 430, the panels may be displayed in cascade. For example, a webpage may include tens of panels, each carrying an image and/or text conveying the result of the programmatic element 410. An example of such a result grouping is shown and described with FIG. 4B.

As an example, in an e-commerce application, the image may be of an item that is for sale, and the descriptive text element may provide the programmatic determined classification for the item. This may convey the results of the object identifier 140 (FIG. 1), when content items 102 are analyzed. For example, in the case where the content item is for a shoe that is on-sale, the text or metadata of the content item may be used to determine that the object in the image is a shoe. The term "shoe" or "boot" or "sneaker" may appear in the text or metadata.

As an alternative or addition, the element 410 may convey the results from the image segmentizer 110 (FIG. 1), which may be in the form of an original image and a segmented image 114 (FIG. 1), with or without text. The human editor 424 may confirm the segmented image is whole, complete etc. Still further, the element 410 may correspond to alignment process 115, where results 1422 convey object images 114 (FIG. 1) in aligned form. The feedback 1421 from human operator, when presented grouped presentation 430, may be identification or selection of panels that show an object in misalignment. Likewise, the element 410 may correspond to feature extraction 120, and the results may be derived from performance of feature extraction 120. The results may be displayed individually, with the object image 114 on which extraction is performed. Numerous other processes may be presented for manual enrichment in a similar manner.

As an alternative or addition to an embodiment, human editor 424 may be able to provide feedback that enables the identified erroneous result to be rectified. For example, the human operator 224 may specify input that corrects the displayed alignment, via text or other kind of input.

FIG. 4B illustrates a manual enrichment process performed on results of segmentation process, such as performed by the image segmentizer of system 100 (FIG. 1), under an embodiment of the invention. According to one implementation, a presentation 460 includes panels 462 comprising results of the segmentation process. Each panel 462 may be presented with a feature 470 for enabling the human editor to approve or reject the programmatic result (i.e. the segmentation on the image). In one embodiment, a Boolean style feature is used for feature 470. The feature 470 may, as default, carry a "correct" value, from which the human operator may manually select "reject" when appropriate. Assuming the programmatic process is correct much more often than incorrect, the cascade presentation of panels enables one human operator to scan through thousands of panels in a relatively short time to reject those panels that convey incorrect results.

As mentioned above, a manual enrichment process such as shown and described with FIG. 4B may be similarly applied to any other programmatic process from which results may be generated.

Image Segmentation and Alignment

Figure 5:
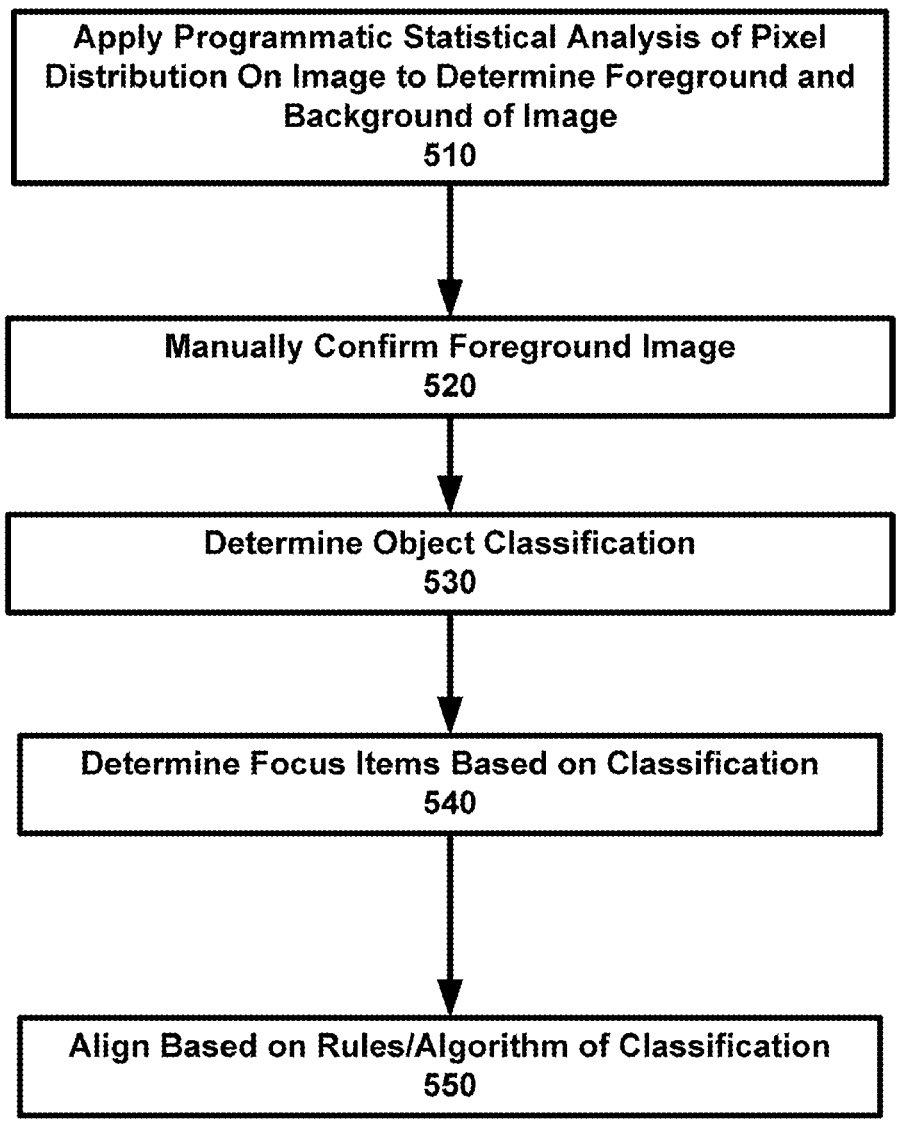
FIG. 5 illustrates a method in which image segmentation and alignment may be performed using a statistical analysis, according to one or more embodiments described herein.

FIG. 5 illustrates a method in which image segmentation and alignment may be performed using a statistical analysis, according to one or more embodiments described herein. A method such as described by an embodiment of FIG. 5 may be executed as part of the image segmentizer of system 100, shown in FIG. 1. Accordingly, reference is made to an embodiment of FIG. 1 in describing an image segmentation algorithm of FIG. 5.

In step 510, a programmatic statistical analysis of a pixel distribution is applied to an image to determine foreground and background elements of the image. Let I be an image. Let F be the features of the image for each pixel. Examples of features are grayscale intensities, values in RGB color space, CIE-L*a*b* or any other color space, or texture and other image features that are derived from the raw image data. Let P be a set of pixels that are at a distance of k pixels from the image boundary. Let m be the median vector of the feature vectors for the pixels belonging to set P. Under one implementation, the following algorithm can be used for segmentation:

1) For each pixel (x,y), a calculation is made of the feature distance from m: $d(x,y)=\|F(x,y)-m\|^2$.

2) Label all pixels for which $d(x,y)<T$ as background, and label all pixels for which $d(x,y)>=T$ as foreground. T is a predefined threshold.

3) A connected component analysis is performed for the background pixels. Connected components are identified when they are of size less than M and label pixels belonging to these connected components as foreground. M is assumed to be a predefined threshold.

4) A connected component analysis is performed for the foreground pixels. Connected components are identified that are of size less than M. Pixels belonging to these connected components are labeled as background.

5) As an additional option, a connected component analysis is performed on the background to identify connected components that do not touch the image boundary. The pixels belonging to these connected components are labeled as foreground.

6) If the foreground or background region size is less than n percentage of the full image size, the segmentation algorithms and processes are performed again, with different parameters, until this condition is invalid. The value of n is a predefined threshold.

The final labeling returns a map in which each pixel is labeled either as foreground and background. The foreground pixels define the segmented image 115, and can then be used for alignment and feature extraction, as performed by other modules of system 100.

As an addition or alternative, other segmentation algorithms may be performed. Among such algorithms are Mincut Max-flow based segmentation, Random walk and first arrival probabilities based image segmentation, Curve evolution and active contours.

In one embodiment, a human is asked to draw a box around the object/product that tightly encases the object. The parts of the original image that are outside the box are considered to be background (we will refer to these as background seeds). A subset of the image inside the box is assigned to be foreground (similarly called foreground seeds). The subset is chosen depending on object-specific knowledge, for example, for t-shirts the middle of the box is a good foreground guess, while for pants the middle top is a good stable guess. The knowledge of what regions are typically good foreground guesses can be extracted by extracting statistics from a training set of segmented object/product examples. The complete segmentation is then obtained by enforcing the assumption that colors and textures are coherent in the foreground and background regions, respectively.

In one implementation, this coherence is enforced using a Markov Random Field over the image pixels, which associates edges with high similarity scores to pairs of adjacent image pixels with similar color and texture, and edges with low similarity scores to pairs of adjacent image pixels lying on boundaries between homogeneous regions. Using this pairwise pixel similarity graph, we can solve for a partitioning of the pixels, that is consistent with the foreground/background seeds and cuts the set of edges with minimal similarity cost. There are different similarity scores possible, based on various models of local region color and texture. In another implementation, the Markov Random Field is augmented with additional color models for the dominant colors in the foreground and background, respectively, which factor as a separate term. In one form of this embodiment, the input of foreground and background can be obtained via a person scribbling on the foreground and background respectively.

Irrespective of the type or implementation of the segmentation algorithms, one or more embodiments provide for the use of manual confirmation to confirm segmentation. Embodiments recognize that programmatic or machine-based segmentation may have error that makes results less reliable than what can be provided by a person. Accordingly, step 520 provides for manual confirmation of the segmentation performed on the images 104, in determining the segmented image 115. In one embodiment, manual confirmation is performed by displaying to a human editor the segmented image 115, and enabling the human editor to accept, reject or edit the segmented image 115 determination.

Once images are segmented, optional steps of alignment and preprocessing may include an objective to align or format images into to a canonical view, and to determine and focus on various parts of the object in the content item. In one embodiment, focus items are category-dependent. Accordingly, step 530 provides that an object classification is determined or retrieved. In one embodiment, information provided through object determinator 150 is used to determine the object classification. Different levels of specificity may define the object class, depending on, for example, the information available from the metadata, text and/or source of the content item 102.

Step 540 then determines the focus item(s) of the image, based on the determined classification. For example, the image of a content item may be known (or determined) to carry a watch, in which case the focus item may correspond to the dial area. In the case of a woman's shoe, the focus item may include the regions of the toe and the heel.

In step 550, one or more rules or algorithms that are specific to the class of the object carried in the image is implemented to perform a desired alignment. Different types of objects include different shapes and features which need to be accommodated in the alignment process.

Figure 6A:
FIG. 6A-6C illustrates results of an embodiment for segmentation and alignment, as applied to an image of a shoe, under an embodiment of the invention.
Figure 6B:
Figure 6C:

FIG. 6A-6C illustrates results of an embodiment as applied to an image of a shoe. In FIG. 6A, the content item image 104 (FIG. 1) corresponds to a shoe image. The image may be retrieved from, for example, a picture on a web page, or a record for display on a web page (such as on an e-commerce site). FIG. 6B illustrates the result of segmentation performed on the image 104 (FIG. 1), corresponding to the segmented image 114. For the case of shoes, in order to perform alignment, the pixels of the vertical foreground are summed. In other words, for each column of the image, an embodiment sums all the pixels that are foreground in that particular column. The example of the sum is shown in FIG. 6C. Then the sum graph is analyzed, and the side that has the higher slope is selected as the heel.

For the case of jewelry items, images (particularly e-commerce images) are often captured in numerous orientations. Without alignment, comparisons performed in visual searches can be more difficult. It is thus desirable to first transform the images to a canonical view, in which the items have the same orientation. This task has varying level of difficulty, depending on the geometry of the particular item. One robust technique of rotating objects relies on the ability to compute a segmentation mask of the object. Such a mask is shown in FIG. 6B, where the white pixels encode parts of the object, and black pixels encode the image background. In previous sections, an embodiment includes different ways of computing the segmentation mask of an object. Given this mask, in one embodiment, Principal Component Analysis is performed over the locations of the white pixels. This is intuitively equivalent to fitting an ellipsoid to the object shape. The direction of the largest eigenvector corresponds to the principal direction along which the mass of the object is spread. However, if the ratio of the first to the second largest eigenvalue is small, the principal direction is not prominent, and a determination may be made to leave the image in the original orientation. Typically watches, rings, bracelets and necklaces are items for which such an alignment process works well, provided good segmentation is available. For rings and necklaces, the focus may be of a large stone or pendant, and ignoring it in the computation of the PCA can further improve the quality of the alignment.

In another embodiment, Hough transform can be used to find the round parts of an image. For Hough transform, each pixel of the image is taken after the segmentation mask, and the circle or ellipse that passes through each 4-point selection is recorded. For each selection of 4-points, least square fitting can be applied to find the best matching circle or ellipse. In order to speed up the process, this process might be applied on a large number of random selections, as opposed to very possible selection of four points.

In another embodiment, the edges of the segmentation mask is found first, which serve as the boundary pixels. Then the circles or ellipse are fitted to the boundary pixels only.

Once all the circles and ellipses are found, a voting is applied on all the circles to find the circle that has the biggest number of hits. The voting can be applied on one aspect first, such as the center location of the circle and then the radius. The final best vote(s) are declared as the winner circle/ellipse(s). In the case of watches, this algorithm can be used to find the face of the watch. Once the face is extracted, more attention can be applied on the face area either while applying feature extraction, or while doing feature (similarity) matching.

Once an automatic segmentation algorithm is applied on the images, the results can be reviewed by the human beings for quality assurance. In one embodiment, a page that includes many images and their corresponding segmentations are shown to the humans. The person would click yes or no if the segmentation is correct or wrong respectively. An example of a such user-interface system or front-end is provided in FIG. 13. The query items that are clicked "No" can then be queued up for further detailed processing. The detailed processing might involve painting all the pixels of the foreground by a simple user-interface and virtual paintbrush, or drawing a rectangle around the object.

Feature Extraction

A feature corresponds to a visual characteristic of an image of an object. A feature is extracted when it is identified, or substantially identified, and then represented as data that is separate from the image. In one embodiment, extracted features are quantified in the form of vectors or values. In another embodiment, some features are identified and then represented as text data.

One or more embodiments provide that images of objects are analyzed in order to identify features of those objects. These features may correspond to colors, patterns, shapes, or other physical characteristics. Extracted features may then be used in the application of the analyzed images. Applications for extracted features include, for example, enabling programmatically generated descriptive terms, or enabling search inputs that are specific to identified features.

Figure 7:
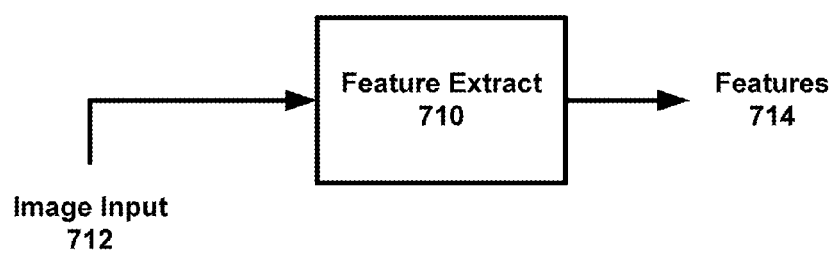
FIG. 7 illustrates a feature extraction module, under an embodiment of the invention.

FIG. 7 illustrates a feature extraction module, under an embodiment of the invention. A feature extraction module 710 may operate independently of any other module or component shown. Any image input 712 that conveys an object may be used. Techniques such as described below may extract features 714 from the image input 712. In one embodiment, the image input 712 includes a segmented image, that is aligned, through use of elements such as described with an embodiment of FIG. 1. As such, embodiments such as described with FIG. 7-9 may be used to implement the feature extraction module 130 of the system shown in FIG. 1.

Figure 8:
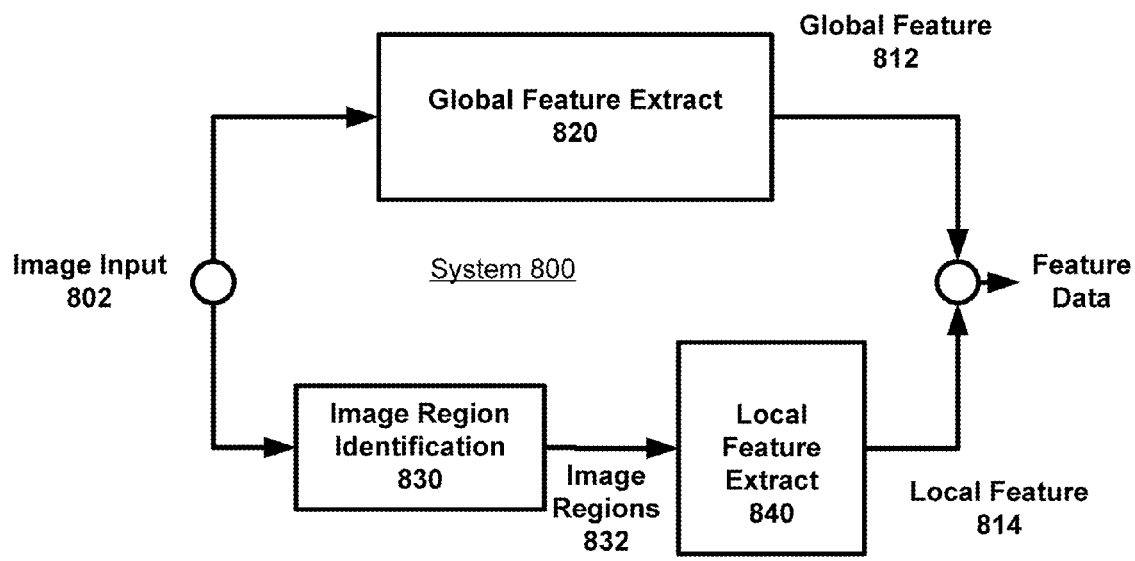
FIG. 8 illustrates modules of a feature extraction system or module, under an embodiment of the invention.

FIG. 8 illustrates modules of a feature extraction system or module (such as shown in FIG. 1 or FIG. 7), under an embodiment of the invention. A feature extraction system 800 may include processes for determining both global features 812 and local features 814. As mentioned, the global feature 812 may correspond to a physical characteristic or attribute that applies to the object of the image as a whole. A global feature extraction module 820 may be used to extract one or more global features 812 from a given image input. In order to determine local features 814, the image input (e.g. image of an object) may be subjected an image region identification process 830, which identifies regions 832 of the object in the image. A local feature extraction module 840 may execute to determine the local features 814 using the identified regions 832.

Figure 9:
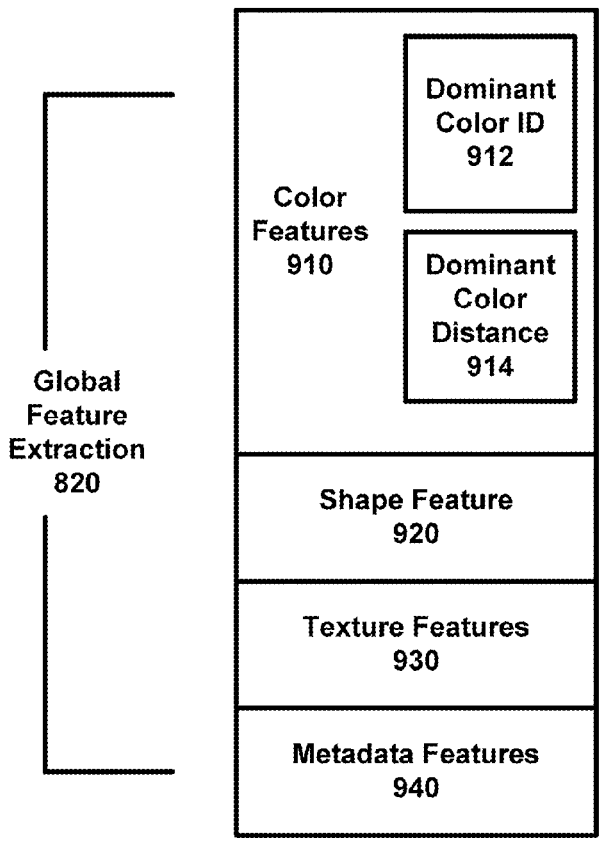
FIG. 9 illustrates components that comprise the global feature module, according to an embodiment of the invention.

FIG. 9 illustrates components that comprise the global feature module, according to an embodiment of the invention. According to one or more embodiments, the global feature extraction component 820 includes a color feature extraction component 910, shape feature component 920, and/or text feature component 930. The color feature extraction component 910 may be used to determine different types of global color features. One global color feature is the dominant or primary color(s) of the image object.

A process 912 of color feature extraction component 910 may perform anyone of numerous techniques for the determination of a primary color of the object in an image. In one embodiment, a dominant color descriptor is used. This color feature extracts the dominant colors of an object. The input is a segmented image of an object and the output is a list of the dominant colors and their weights.

In one embodiment, process 912 determines principle colors using a k-means clustering algorithm. A red-green-blue (RGB) space or any other color space (HSV, lab etc) can be used. A k-means clustering algorithm may be implemented by first sampling a fixed number of RGB pixels in a given object image (e.g. object image 114 uses in system 100 of FIG. 1). A set of k centers (not too close together) are chosen from the pixels. The k-means is used to determine the final cluster centers (in RGB space). If two clusters are close together, then they are merged. If a cluster is two small, it is removed. The final cluster centers are the dominant colors and the cluster size is normalized to be the weight.

A process 914 of the color feature extraction component 910 determines a feature distance between two dominant colors in an image. Given two or more color features on one object, or multiple objects or physically distinct features in one object, a distance between the two features may be computed by matching the dominant color of the first feature to the closest dominant color in the second feature. The computation of the distance may utilize a pairwise distance function described below, while at the same time accommodating the determined weights, so that all the color weight from the first feature is matched to all the color weight of the second feature. The final distance is the weighted sum of all the pairwise color distances. The pairwise distance is the color distance between two individual colors. This distance is composed of three components. The first component is the L2 distance between the two RGB vectors. The second component is the angle between the two RGB vectors. This angle is sensitive to color changes, but insensitive to changes in lighting. The third component is a normalization term based on the lengths of the two RGB vectors. This normalization term prevents bright colors (with high RGB vectors) from being penalized unfairly. In addition, colors with RGB vectors below a certain length (very dark pixels) only use the L2 distance of the RGB vectors.

As an alternative or variation to how processes 912 and 914 are performed, colors (as global features) may be determined using color histograms of an overall image of an object.

As another alternative or variation to how processes 912 and 914 are performed, an image may be divided into multiple regions, and an individual color histogram may be obtained for each regions. Such an approach not only captures the color variations, but may also capture the layout distribution of the colors.

Still further, another embodiment provides that a perceptual color space is developed. A collection of color names are obtained (e.g. blue, green, pink, red, black). Then, colors covering the RGB space are shown to humans, who provide feedback that matches colors to the corresponding names. In this way, a variety of color tones that are assigned to a particular color name are identified. A machine learning technique may be executed to learn the mappings between the colors vectors and the color names. As an option, a color look-up table can be used for this purpose.

A shape feature component 920 may identify a global shape feature from an image object. The shape feature component 920 may use the segmentation mask for a given image object in obtaining the shape feature. In particular, the component 920 determines the shape features from the boundaries of the foreground pixels. In one embodiment, a contour feature can be used. First edge detection is applied to detect the boundary pixels. Next, one of the several techniques can be applied to the collection of boundary pixels. In one embodiment, the boundary pixels are put into a vector. Then, Elliptic Fourier Descriptors, or Moment Descriptors can be calculated on the collection of the boundary pixels.

In another embodiment, the shape feature component applies a Principal Component Analysis on the collection of boundary pixels. First, the list of boundary points are aligned. For example, a north-most point in the image can be chosen as the starting point of the boundary sequence. Then the boundary pixel locations may be written to a vector in order. Then Principal Component Analysis is applied on this list, and the first few k Eigen Values are chosen as the representative of the contour of the image.

In another embodiment, the component 920 uses the shape features that represent the areal distribution of pixels. One such example is Region-Shape-Descriptor (RSD). The region-based shape descriptor utilizes a set of ART (Angular Radial Transform) coefficients. ART is a 2-D complex transform defined on a unit disk in polar coordinates. RSD takes into account all pixels constituting the shape, including both the boundary and interior pixels. It is therefore applicable to objects consisting of a single connected region or multiple regions, possibly with holes.

In another embodiment, the shape feature component 920 is configured to capture the layout of the image that can be used. Edge histogram distributions (EHD) is one such feature. The edge histogram descriptor represents local-edge distribution in the image. Specifically, dividing the image space into n-x-n sub-images, the local-edge distribution for each sub-image can be represented by a histogram. To generate the histogram, edges in the sub-images are categorized into five types: vertical, horizontal, diagonal (45 degrees), diagonal (135 degrees), and non-directional edges. Then the combination of these histograms on the overall sub-images serve as a layout descriptor for the image. This feature can also be used as a texture descriptor. As such, it would capture both shape and texture features of the image.

In order to make image matching robust against variations such as translation, the implementation of EHD also derives semi-global and global edge distributions by averaging the original local edge histograms on larger blocks and on the whole image. In addition, one or more embodiments disclose a further improvement to standard EHD to make it invariant to object flips (for examples, matching a shoe pointing to left with a shoe pointing to right). In that case, EHD features are extracted twice, one from the original image, and one from the flipped image. The combination of the two features are complimentary in that they ensure that flipped images can match against other.

The texture feature component 930 identifies texture features from the image object. More specifically, the texture feature component 930 determines the patterns inside objects. These may include, for example, checkered or stripped patters on clothing or luggage. In one embodiment, texture feature component 930 includes several convolition filters, which are passed through the object image. Each of these filters capture different characteristics about the image, for instance different filters might capture horizontal edges, vertical edges, tilted edges, no-edges, and/or different resolution edges. Texture descriptors can be created by getting the distributions of these features. For instance, the histograms of vertical and horizontal edges can be used to capture the difference between the horizontally striped shirt versus a vertically striped shirt, versus a checker pattern shirt. The distributions can be obtained in various ways. In one embodiment, texture feature component 930 obtains the histograms of the scalar convolution outputs. In another embodiment, texture feature component 930 combines the outputs of multiple convolution filters into a multi-dimensional histogram. As an example, vector quantization can be used for this objective. First, k-mean clustering can be applied on a collection of convolution outputs. This step determines the cluster centers. Then vector quantization can be applied for each image and a distribution of the convolution outputs is obtained per image. This distribution is used as a feature vector for representing the texture of the input image. In one embodiment, texture feature component 930 obtains texture features using only data from within the segmentation mask.

In another embodiment, the texture feature can be obtained from a box or other geometric shape that is completely included in the segmentation mask. In another embodiment, Gabor filters can be used to extract the texture features. This feature is a Gaussian weighted sinusoid, and is used to model individual channels in an image, where each channel corresponds to a specific type of texture. Then for each channel, some type of statistics such as the energy, and energy deviation or energy distribution are saved.

The metadata feature component 940 determines metadata features from content associated with the object image. In an embodiment of FIG. 9, the term metadata is used to denote the text fields associated with a procured (e.g, through web crawling) content item. These include the item title, description, brand, associated keywords, price, unique product number and product categories the item is thought to belong to. In an embodiment, the metadata feature component 940 may be implemented as part of the object identifier 140 of FIG. 1, including as part of the text and metadata analyzer 145.

Such metadata has several different uses. One major use is to extract features that would then be used to identify the similarity of different objects. Important clues for similarity of two product items can be extracted from their metadata descriptions. For example, metadata usually contains the item type (casual sandal), brand (TeVa), a description of the item containing useful expressions such as rubber sole, strappy, leather. Based on these features, a similarity score between two items can be obtained.

In one embodiment, the relative importance of the different terms (words and phrases) in the metadata is estimated using the inverse document frequency (IDF). The IDF score for a term is the logarithm of the number of all product items in a sample collection, divided by the number of product items in that collection whose descriptions contain the term. Intuitively, when a term is relatively rare in the whole collection of documents, it is considered more important for similarity. A description of an item can thus be represented using a sparse vector containing the IDF scores for the terms that appear in its description. The similarity of two items then can be defined as the cosine of their IDF score vectors.

In another embodiment, the text in the different text fields (e.g. title, associated keywords, description, brand, etc.) may contain terms of different level of importance with regard to the perceived similarity of two items. Hence the IDF term vectors for each of those fields can be compared separately, and combined to obtain the final score. The combination can be a simple linear function of the separate text field scores, or a more complicated non-linear combination. This combination can be defined by human operators, or learned on a collected data set (ground truth dataset) of similarity data, where users specify which items they think are similar, and which are different. Any standard classification or regression method, including but not limited to logistic regression, least-squares regression, linear discriminant analysis, boosting, support vector machines etc. can be used in learning this combination.

In another embodiment, human operators can be employed in identifying buzzword expressions. These expressions are words or phrases deemed to be of particular importance for determining item similarity (e.g. pointed-toe shoes, lace-up shoes, analog watch). The IDF terms associated with these buzzwords can be weighted separately from the rest; the tradeoff can be learned on a collected set of similarity data and standard classification or regression algorithms.

In another embodiment, human operators can specify additional information about the buzzwords. There are different ways to describe the same concept, hence may be beneficial to identify synonym phrases that all correspond to a particular buzzword. Also, buzzword expressions can be combined into sets. For example, a set of buzzwords that describes different kinds of shoe toe styles would include buzzwords such as split toe, round toe, square toe, open toe, or pointed toe. As there is a fairly limited number of such sets, the IDF scores for these items can be ignored, and instead the importance of each buzzword set relative to the rest can also be learned using a collected set of similarity data and standard classification or regression algorithms.

Another embodiment addresses the issue that text fields do not always contain all the appropriate buzzwords for the item. The set of buzzwords describing the item can be enriched based on visual cues. For example, the item colors can be estimated from the associated picture of the item using a clustering algorithm, such as k-means or Gaussian mixture models. The top colors and their amounts that are identified can be added to the item metadata. Similarly, separate detectors can be built that detect certain properties of product items (e.g. which shoes have stilettos) in the images of the items. These detectors can be trained on a labeled collection of items, using standard image classification algorithms such as but not limited to boosting and support vector machines. Buzzwords detected above a given level of certainty are added to the metadata.

In another embodiment, human operators can do manual enrichment on the set of buzzwords. The simplest embodiment has humans scanning all items of interest to identify a particular buzzword (e.g. whether shoes have stilettos). A more advanced embodiment pre-filters the candidate items uses automatic enrichment methods such as those described in the previous paragraph. In addition to image cues, textual cues can also be used in manual enrichment. For example, if the item is labeled as sandals, it can be determined with reasonable certainty that a number of buzzwords such as boots, knee-high, closed toe, etc. do not apply with very high probability.

In another embodiment, the image classification techniques can be used to add metadata features. For instance, a "Strappy" shoe detector can be used to identify that a shoe is strappy, and the word "Strappy" can be added to the metadata of the particular item.

Figure 10:
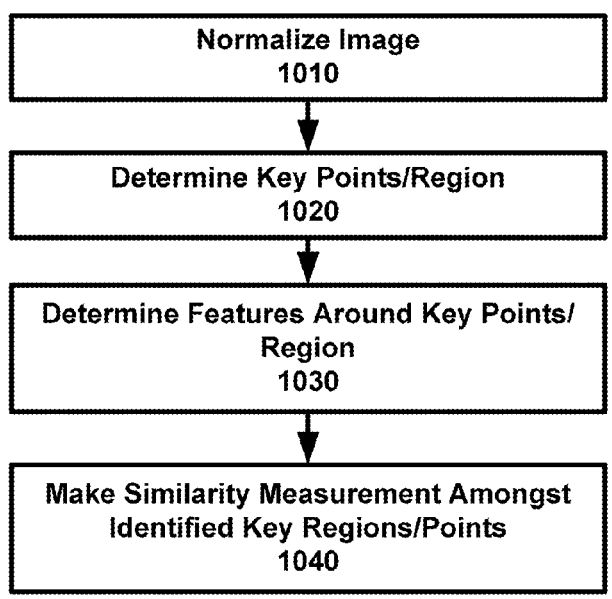
FIG. 10 illustrates a method for determining and extracting local features from an image object, under an embodiment of the invention.

FIG. 10 illustrates a method for determining and extracting local features from an image object, under an embodiment of the invention. A method such as described may be performed by any of the feature extraction modules described above, including with an embodiment of FIG. 1 or FIG. 7. A method such as described may be implemented on an object image.

As mentioned, the feature extraction module such as described with an embodiment of FIG. 7-9 may be configured to extract local features. Among other benefits, the use of local features provides the user with the ability to fine tune or limit a visual or image search by specifying sub-regions of a given region for use as the basis of a search query. The features from a sub-region of the image enables a search based on only a sub-region of the image. Thus, for example, a user may perform a visual search for shoe, while specifying a heel shape or an image of a heel as the query. In describing a method of FIG. 10, reference may be made to elements or components of other figures, for purpose of illustrating suitable elements or components for performing a step or sub-step being described.

In one embodiment, local HOG features can be obtained in key points of an image. The steps of this algorithm are described next.

In order to facilitate the use of local features in an image, step 1010 provides that each image is normalized such that all images have same bounds and extents. Normalizing the image includes normalizing an overall size of the image. With reference to an embodiment of FIG. 8, step 1010 may be performed by, for example, image region identification process 830, as part of a process of identifying regions of an object image.

Additionally, step 1010 is more relevant for searching online shopping images where there is often only one object in the image under analysis. In such cases, the act of pre-normalizing the image to a fixed size avoid issues that may otherwise be caused by the scale changes. For images present in online shopping websites, the system estimates a tight bounding box around the segmented foreground in the image and normalizes the image to a pre-determined fixed resolution.

Step 1020 provides that key points or regions of an object image are determined for the object image. Key points or regions are defined as those characteristics image regions which have high auto-correlation. The main characteristics of such key points or regions include (i) a key point or region is reliably detectable even if an angle of image capture varies, and (ii) the point or region detection performance is repeatable for a given key point or region detector provided that locally the image regions are visually similar. Examples of such key point detectors include Harris detector, and scale, rotation invariant Harris-Laplace detector. With reference to an embodiment of FIG. 8, step 1020 may be performed by, for example, image region identification process 830, as part of a process of identifying regions of an object image.

In step 1030, descriptors are computed around these key points or regions. These descriptors attempt to capture the shape, color or texture around the key points or regions in a high dimensional feature vector. For example, histograms for color channels can be used as color descriptors, three-dimensional spatial-orientation histograms of image gradients as shape descriptors, and Gabor filters as texture descriptors. As another example, one can use Color-Spatial Histograms (CSH) as color descriptors, Histogram of Oriented Gradients (HOG) or Geometric Blur feature as shape descriptors, and Gabor filters as texture descriptors. Most of these descriptors require spatial context around the key point or region. If a key region detector is used, then the spatial context is automatically defined to be proportional to the region of the region detector. If a key point detector which does not provide any scale information is used, then the system uses a user configurable predefined M×M pixel region around the key point as the spatial context. The following includes description of embodiments in which Color Spatial Histogram features (CSH), and histogram of oriented gradients (HOGs) are implemented.

Color Spatial Histogram features (CSH): These features can be used as an alternative to simple color histograms. To compute these descriptors, the local image region around the key point or region is divided into pre-configured K×K cells. Each cells defines local regions of L×L pixels. A color histogram is computed for each of these cells. To avoid aliasing effect, pixels which are close to cell boundaries are voted using bilinear interpolation. Any of RGB, Lab or Luv color space can be used to compute color histograms. The color histograms are then normalized by performing L2 or L1 normalization. The advantage of these color-spatial histograms is that they also capture the spatial location of the colors with respect to key point and/or region and hence have more spatial-discriminative powers.

Histogram of Oriented Gradients (HOGs): These features are based on image gradients. According to one embodiment, processing chain of HOG computation involves following steps: (i) Computing an image gradient in the local spatial region. For color images, the gradient is computed for each color channel and one with maximum magnitude is taken as final gradient value. Optionally, one can compress the image intensities by computing square root of image intensities, which helps dampen the effect of sudden gradient changes in the image region. (ii) Next, local image region may be divided around the key point and/or region into K×K cells with each cell of L×L pixels. (iii) A three-dimensional spatial-orientation histogram is computed where the weights in the histogram are weighted by their gradient magnitude.

Step 1040 provides that a similarity measurement amongst key points or regions is enabled. This enables the identified local descriptors for form the basis of data that is searched against, for example, another local descriptor serving as a query. Similarity and feature searching is described with additional detail and variations in following sections. According to an embodiment, histograms from all cells are concatenated into one single feature vector. This vector is normalized by L2 or L1 normalization to provide invariance to color changes, and the final result is used as the local shape features. Once the features are obtained, for each descriptor a similarity measure is defined. The similarity measures allow the system to measure the similarity of one point with respect to any another point. The system uses one of the following distance measures: L2 metric (i.e. Euclidean distance), L1 metric, L-∞ metric, or Bhattacharya coefficient. Other measures which can be considered are the KL or Jensen-Shannon divergence.

As an alternative or addition, a Local Similarity Search Algorithm may be used. A system implementing such an algorithm may be initialized by loading all key points and/or regions and their corresponding descriptors for each image in the database. If the number of images is so large that all descriptors can not fit into the RAM of one machine, then a set of machines is employed and the images and corresponding key points and/or region descriptors are distributed on these machines. The key requirement in the search algorithm described below is to compute nearest neighbors for a given point. However as the number of key points or regions easily becomes very large, a naive linear search is sometimes not possible. In such systems, a component or system may compute spill-trees or Locality Sensitive Hashing on the descriptors. These algorithms provides the capability of fast returning the top N nearest neighbors for any given point.

With extraction of local features, subsequent image searching of local features may be performed on a collection of images. In one embodiment, when a user selects an image region, the system searches for all key points or regions underlying the user selected region. These key points and/or regions form the query points or regions. If user selects a new query image or does not make a selection then all points and/or regions present on the image are taken as query points and/or regions.

For each query point and/or region, the system searches for top N most similar key points and/or regions. The similarity is defined by one of the above described similarity metrics. Each of these N nearest neighbors are mapped to the corresponding image in the database. These mapped images form the potential search results. A default rank of 0 is assigned to each of these images. Sometimes multiple points or regions from an image in the database matches to a query point or region. This results in many to many mappings of the points.

Depending upon the user configurations, one of the following algorithms may be used to assign ranking to images. For example, one of the following algorithm may be programmatically called once for each potential image which is to be ranked.

Simple Voting: This algorithm first performs a greedy best one to one matching (in terms of values returned by the similarity metric above) for each query point and/or region. This converts the many to many mappings above to one to one mapping. The algorithm then converts distances returned by similarity metrics to goodness scores. As an example, for L2 metric, the system employs exponential of the L2 distance as the goodness measure. The search algorithm keeps count of number of votes (obtained by summing goodness scores for each query points and/or regions) for each image. After a vote is computed for each potential image, the output of the search algorithm is the images sorted in descending order of these votes.

As an alternative or variation, another technique after one to one mapping is to treat these feature distances as likelihoods of matchings, and sum the distances for all points in the local region to compute the overall dissimilarity measure. An optional step is to compute occurrence frequency of each feature. The goodness scores during matching is then downweighted such that more frequently occurring features have less weight. This ensures that only most striking features are used in similarity matching.

Translation Constraint: This method tries to find the best two dimensional translation that maps the query image points or regions to each of the images in the potential image list. The system employs the RANSAC algorithm to robustly compute the matching. The images are sorted in descending order of the number of points and/or regions, which satisfy the translation constraint.

Similarity Constraint: This algorithm is similar to the translation constraint but here the algorithm tries to find the best 2-D similarity transformation that maps the query image region to each of the image in the potential image list.

Affine Constraint. This algorithm is similar to the similarity constraint but here the algorithm tries to find the best two-dimensional affine transformation that maps the query image region to the each of the image in the potential image list.

With further reference to embodiments of FIG. 7 thru FIG. 10, and as an alternative or addition, one or more embodiments enable the user to fuse search results by defining multiple selections. Here the user selects an image region and the system returns the most similarly ranked images. Now the user can select another image region and ask the system to return intersection or union of the two search results. More than two selections can be defined in a similar fashion. This allows user to further fine tune their results by refining their queries in a stepwise manner.

As still another additional or alternative to embodiments of FIG. 7 thru 10, one or more embodiments enable features to be extracted that are identified as global features. However, such features are extracted only in a local region (tile). This allows users to search objects based on local appearances. The input is the segmented image of an object. The bounding box of the segmented object is tiled into a fixed number of tiles (M×M) and (global) image features (such as dominant color and EHD) are computed for each tile. The feature is stored as the concatenation of all the features of all the tiles. In one embodiment, a local search is performed by selecting a rectangle in the query image. The tiles that intersect the rectangle are used in the image search. The feature distance is the sum of the distances of all the features in the corresponding tiles, weighted by the area of overlap between the tile and the query rectangle. The final distance is normalized by the number of tiles.

In another embodiment, the tile based features and the HOG based (key-point) based features can be combined to increase the accuracy of a local search. In yet another embodiment, these algorithms can run in a cascade, for instance the tile based algorithm can run first to determine the candidates, and the key point based algorithm can be executed next.

According to an embodiment, the local feature extraction component 830 (FIG. 8) may be configured to automatically detect regions and extract features on sub-regions. In one embodiment, a Content-based Image Retrieval (CBIR) algorithm or process may be implemented. CBIR refers to processes that attempts to find images similar to a given query image using visual information instead of contextual text meta-data. Most conventional methods base the search on global (whole-image-wide) visual features such as color, texture, and shape. Although such methods can be effective in locating globally similar matches, they may miss important regional features. In order to capture regional features, automatic region segmentation (perhaps plus manual verification) is usually employed to obtain the meaningful regions before feature extraction can be carried out on those regions. However, region segmentation is still an open problem and any region segmentation method will have dead corners. Although human verification and editing can make up for the computer errors, such manual effort can be slow and add significant costs in high-volume real-world applications. One or more embodiments disclose a cost-effective method for region-base image search that can be used under one embodiment.

System for Enabling Search of Analyzed Images

One primary use for an image analysis system such as described with embodiments provided above is to enable search of images and other content for applications such as e-commerce. As mentioned elsewhere, one use for a system or method for analyzing content items that carry images (such as described with an embodiment of FIG. 1) is to enable a search system that enables queries to specify image data or values. A conventional image searching system is normally based on text queries. For example, popular search engines on the Internet use text meta-data associated with each image to determine the keywords and search images based on these keywords. This conventional approach has several disadvantages. Among the disadvantages, (i) the algorithms are based on the text surrounding an image not on the content present in the image, and (ii) the user or source of the search query is unable to fine tune the search by specifying sub-regions on the query image. As such, there is a need for enabling image searching using queries that specify content in the form of image data, or otherwise non-textually.

CBIR algorithms search for images similar to a given query image using visual information. Most algorithms are based on global (whole image wide) visual features such as color, texture and/or shape. Such methods are effective in locating globally similar matches, but may miss important regional features. Moreover they do not provide enough flexibility to the user to fine-tune their searches by selecting regions of specific image.

In contrast, embodiments described herein provide effective methods for searching visually similar images from a large database (e.g. of order of million of images) all the while providing user the flexibility of fine tuning their searches by giving relevance feedback. One or more embodiments also include human assistance and quality assurance in many aspects of processing, such as categorization, a segmentation, extraction of key points, all of which can be employed as preprocessing steps in the system.

A system such as described may be used in connection with other embodiments described herein to enable search of records carrying images, using anyone or more of different kinds of records.

Figure 11:
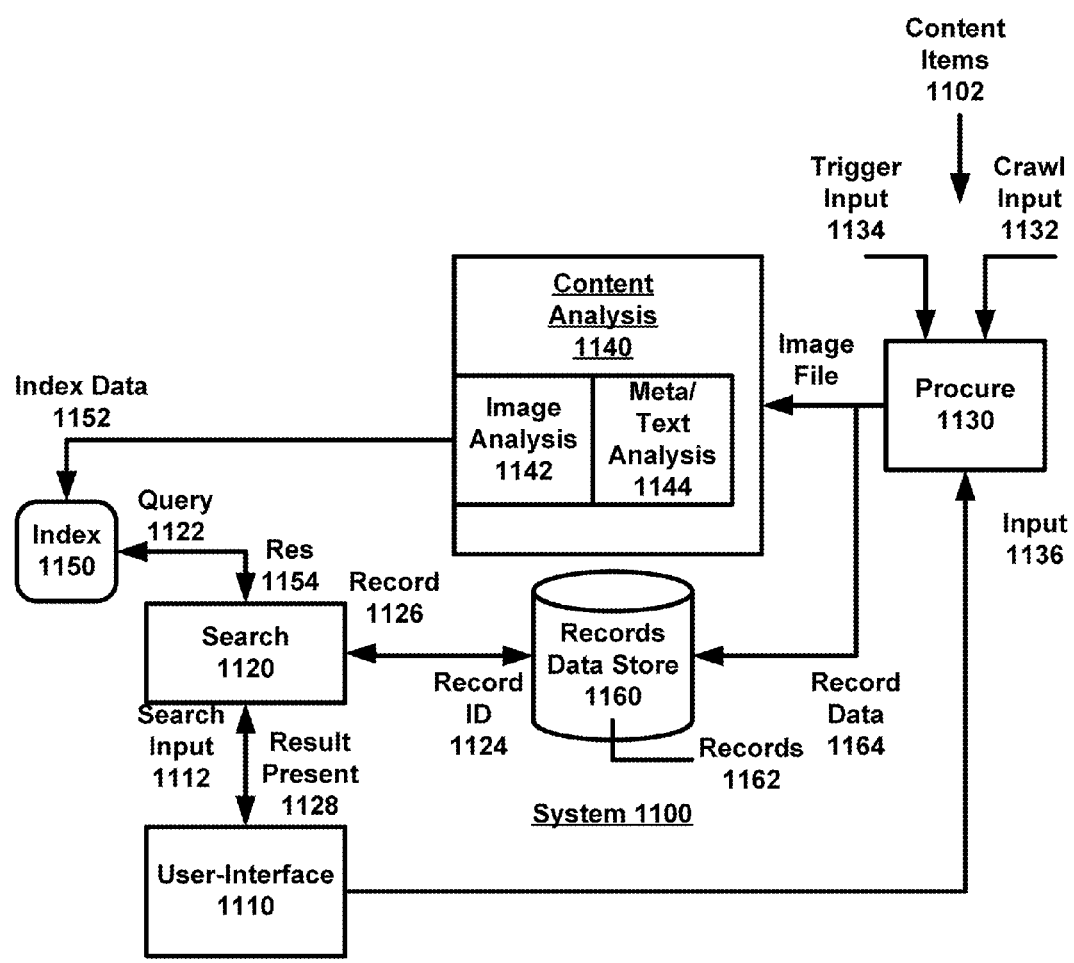
FIG. 11 illustrates a search system for enabling search of images, according to an embodiment of the invention.

FIG. 11 illustrates a search system for enabling search of images, according to an embodiment of the invention. In one embodiment, a search system of FIG. 11 may be combined with a system of FIG. 1, and/or with components described therein or elsewhere in this application, to enable searching that are based at least in part on queries that specify image data and/or values. In such embodiments, embodiments described with FIG. 1 and elsewhere in this application may be used in order to aggregate data corresponding to searchable image data.

In FIG. 11, a search system 1100 includes modules in the form of a user-interface 1110, search 1120, and procurement 1130. The modules may operate in connection with a content analysis system 1140 that analyzes the image, text and metadata content of records. Additionally, the system 1100 may include an index 1150 which stores index data 1152 generated from the analysis of images and content item. The index data 1152 may be generated as a result of the performance of the content analysis system 1140. System 1100 may include a record data store 1160 that holds records 1162 that include content items analyzed by the content analysis system 1140. Procurement 1130 may retrieve and populate records 1162 with record data 1164.

According to an embodiment, the procure 1130 retrieves record information about the content item 1102 that can be used to categorize or search by classification. For example, in an e-commerce application, the record data 1164 may correspond to the price of the item for sale, the brand or manufacturer of the item, and the source of where the item may be purchased. Other information about the content item 1102 may include, for example, its quality and/or its material of fabrication. All of the examples provided for record data 1164 illustrate use of text and metadata associated or contained within the content item 1102 that can later be used to categorize the content item.

As described with an embodiment of FIG. 1 and elsewhere above, the content analysis system 1140 may comprise a "backend" of an overall search system. The content analysis system 1140 may include an image analysis component 1142 and a meta/text analysis component 1144 for analyzing content items 1102 Content items 1102, in the form of web content, for example, containing images, text and metadata may be analyzed for purpose of (i) classifying the object or objects in a content item, (ii) generating data that is descriptive or representative of global and/or local features of the object image in the individual content items, and/or (iii) generating signatures that provide quantitative information about the appearance of the object in the image, including of the global and local features. Additionally, one or more embodiments provide that the content analysis system 1140 generates or identifies text and metadata from content items 1102 or data associated with content items, for use in establishing text-based data that serves as at least a part of a comparison or matching process in an overall search algorithm. The text and/or metadata may include both (i) text/meta data existing in or with the associated contact record, and/or (ii) text/meta data generated from recognizing or analyzing images.

According to an embodiment, the content analysis system 1140 outputs index data 1152 for index 1150. For a given object in an image, index data 1152 may include data that represents one or more of (i) the classification(s) of a given object, (ii) global features of the object, (iii) localized segments of the object, (iv) local features of the object, (v) text and metadata carried or associated with the content item from which the object in the image was located, (vi) text and metadata generated from local features, global features or other image recognition/analysis results, and/or (vii) any combination thereof. More than one index 1150 may be used to store the index data 1152, particularly index data of different types. The index 1150 may be maintained on a server-side system, using one or more machines.

With regard to at least some of the index data 1152, one or more embodiments provide for quantitatively representing the local and global feature data in the index 1150. Once the image features (visual signatures) are indexed, all the preprocessing steps are completed. In one embodiment, the indexes are loaded to memory when the servers get started. In another embodiment, the indexes stay in the disk, and they are loaded during the search time. In yet another embodiment, a cache can be used along with one of the other embodiments. This cache would store the most frequently used search results in the memory, and when such a search happens, it returns the results right away. If there is enough memory, then the cache can hold all possible search results. In one implementation, one or more quantization algorithms can be used to pack 4-byte floating point values to 1-byte to enhance storage and use of the index or indexes.

According to an embodiment, the index data 1152 that corresponds to the global and/or local features may be stored linearly, one after another in an index file (or database). Such an index structure enables a subsequent search to be performed by scanning all of the index data items one by one. Distances between individual index data items may be calculated one by one, and the results of the calculated distances are also stored. Implementation of such a technique enables an optimal result to be obtained, since every single item is considered during search. However, without further modification, a search that uses the index structure may take an unnecessary long time. In order to speed up the linear storage and search, the index 1150 may divided onto multiple machines. At search time, a search query is sent to multiple machines at the same time. A reply may be formulated that incorporates the first N results back from each machine. The component providing the compilation of the results may reorder the results received from each machine.

In another embodiment, the features are indexed using other structures, such as spill trees, ball trees, vector quantization (based trees). These techniques store the features in leaves of a trees structure of the index 1150. Each node of the tree may serve as a decision mechanism for focusing only a part of the inventory. Such a technique enables a search to be performed faster than, for example, the linear technique described above. However, this techniques does not provide the exact same result as the linear search. As such, there is a loss of accuracy in the results.

In one embodiment, the fast features correspond to generalized criteria. As an example, but without any limitation, the generalized criteria could be color or shape only. In the case wherein image searching is performed using signatures (e.g. vectors) that represent images, a cascade search is progressive, with a first pass through the index using a shortened (e.g. truncated or abbreviated) version of a signature that forms some or all of the search criteria. A subsequent signature may use a longer or more complete version of the signature, and then compared against the results identified from the first pass through. Still further, the signature and the remainder of the search criteria may be progressively expanded to match the original query. With each expansion, the signature may be searched against a portion of the index that was identified from the previous search, using the previously expanded signature/search criteria. In this way, the search is performed in a series of cascade operations, with a first search making a fast (i.e. less data-intensive) pass through the index or library of files being searched, in order to identify a subset.

In one embodiment, the fast features correspond to generalized criteria. In the case wherein image searching is performed using signatures (e.g. vectors) that represent images, a cascade search is progressive, with a first pass through the index using a shortened (e.g. truncated or abbreviated) version of a signature that forms some or all of the search criteria. A subsequent signature may use a longer or more complete version of the signature, and then compared against the results identified from the first pass through. Still further, the signature and the remainder of the search criteria may be progressively expanded to match the original query. With each expansion, the signature may be searched against a portion of the index that was identified from the previous search, using the previously expanded signature/search criteria. In this way, the search is performed in a series of cascade operations, with a first search making a fast (i.e. less data-intensive) pass through the index or library of files being searched, in order to identify a subset.

Under one implementation, for example, in the first pass, the search criteria is broad and not computationally intensive, and serves to quickly reduce the searchable index or collection. A subsequent pass may progressively lengthen the signature (or make the signature or search criteria more specific) and/or search criteria, but the signature/search criteria is compared against the reduced index or collection. Under an embodiment, third or subsequent passes are performed in cascade, with the signature or search criteria progressively lengthening while the field of search reduces. In the case of image searching, for example, where the image data query and field of search require use of large data items (e.g. visual signatures), a reduction of computational intensity of the search improves the speed by which the outcome is determined. The use of a cascade search structure provides one technique by which the search can be enhanced in terms of speed. Initially, the search criteria is not very specific and small, or not computationally intensive. As the portion of the data collection that is searched becomes smaller, the search criteria or signature becomes more specific, and larger (or more computationally intensive).

In another embodiment, the search results for all queries can be saved. If there are reasonably small number of search elements (e.g. 10 million), a defined set of K (where K could be a few thousands) results can be saved for each query. This way, there is no calculation of distance values on the fly.

Further on the backend, procurement 1130 may include web crawlers that crawl various network sites for content items 1102. The type of content items 1102 that are sought may depend on the application for system 1100. In one embodiment, system 1100 is used to enable visual searching of merchandise, in which case procurement 1130 crawls (through crawl input 1132) e-commerce sites. As an addition or alternative, the procurement 1130 may crawl blogs, media sites and other network sites. In an e-commerce application, the procurement 1130 may seek content items that can provide a basis for a search for merchandise. For example, outfits worn by celebrities may be identified from pages on which celebrity gossip is provided. Other applications for system 1110 include social networking and online dating. In such applications, the content items may correspond to pages that show persons, faces, or clothing, attire or apparel used by persons. Numerous other applications exist.

As an addition or alternative, procurement 1130 may also operate off of content items that provide trigger input 1134. Trigger input 1134 includes content items that are to form the basis of a search query, as specified by users on remote network sites that are independent of the search system 1100. Such sites may, for example, contain images that an individual may want to use as the basis of performing a search for matching merchandise items (e.g. a user may want to wear a dress that looks similar to one worn by an actress). As still another addition or alternative, procurement 1130 may also operate off of content items supplied by a user (e.g. through upload or other online submission). For example, a user may submit a digital photograph that is to be analyzed. Procurement 1130 may handle trigger input 1134 and user-input 1136 similarly, in forwarding the image file data from those inputs to the content analysis system 1140. Rather than content analysis system 1140 indexing the results of these inputs, pertinent portions of the analysis may be returned to a front end component for formation of a search query. The pertinent portions may correspond to an image that is segmented (from its original submission) to display an object, along with identification of its global and/or local features (either quantitative or as text), and possibly metadata or text provided or included in the submission.

On the front end of system 1100, user-interface 1110 may be coupled or integrated with a search 1120 and executed from a server or server-side system to an audience of terminals. In a network or Internet implementation, user-interface 1110 includes a web page component that is downloaded onto a terminal of a user. The web page component may include functionality that enables the user to specify a search input 1112. This search input 1112 may include (i) inputs of processed (previously recognized images), (ii) inputs of un-processed (never before recognized) images, (iii) inputs that specify a global feature (e.g. primary color), (iv) inputs that specify a local feature (e.g. shape or pattern in a region of an object), (v) classification input, and/or (vi) text input of information determined from recognition and analysis of images. Moreover, text searching and/or meta-data searching may be enabled using original text/metadata provided with the record. The search interface 1120 uses the inputs, either individually or in combination, to generate one or more search queries 1122 that are processed against index 1150. The index 1150 returns results 1154 that identify content records 1124 that satisfy criteria of the query 1122. The search module 1120 may retrieve the identified records 1126 from the record data store 1160 and returns search result presentation 1128 that is based on one or more of the identified records 1126. The search result presentation 1128 may, for example, be in the form of a web page that displays individual results as panels, each panel containing an image and optional text and/or metadata.

In one embodiment, search module 1120 is equipped to perform category specific searches. These include searches where content records are searched by classification. For example, in the case where record data 1164 identifies category information from the content item 1102 or its context (e.g. manufacturer, brand, price or price range, quality, material of manufacturer), search module 1120 may be able to formulate query 1122 to include the category or classification specification. The category or classification 1122 may be combined with, for example, other use input (including image or text input), or alternatively provided as a stand-alone query. In this use, search module 1120 may use price, brand, or manufacturer, for example, to influence the search result. For example, when the user-input specifies a merchandise item, and the search yields multiple similar items in appearance, price of the items in the search may influence where and how individual items of the result are made to appear to the user.

In addition to category searching, one or more embodiments also contemplate cross-category searching. More specifically, in the case where a user-input specifies one type of category (e.g. "shoes" in an e-commerce application), an embodiment may extend the visual characteristics of the specified category to other categories (.g. "purses" or "shirts") to return some results that match in appearance (if not category). Such an embodiment has application to e-commerce, where a user's desire to view, for example, clothing or apparel, offers an opportunity to suggest items from a different category that may also be of interest. In order to implement such an embodiment, search module 1120 may simply submit two queries-one query that includes image data or other criteria combined with a category or classification, and another query that excludes the category or classification (or submits alternative category or classifications). Alternatively, the search module 1120 may omit the category or classification when searching, and use only image data or text input. Then on obtaining initial results, the search module 1120 may implement one or more filters to identify items by category or classification.

As an addition or alternative, in order to enable input of local features, the user-interface 1110 may be configured to enable a user to select or specify a portion of a processed image as the search input 1112. The processed image may be existing, or it may be analyzed on the fly in the case of trigger inputs 134 and user-inputs 136. In either case, portions of the image may be made selectable, or at least identifiable with user input. Once selected, the portion of the image can form the basis of the query, or the user may manipulate or specify additional features that are to be combined with that portion. For example, the user may specify a portion of an object image, then specify a color that the portion of the object is to possess.

Figure 12:
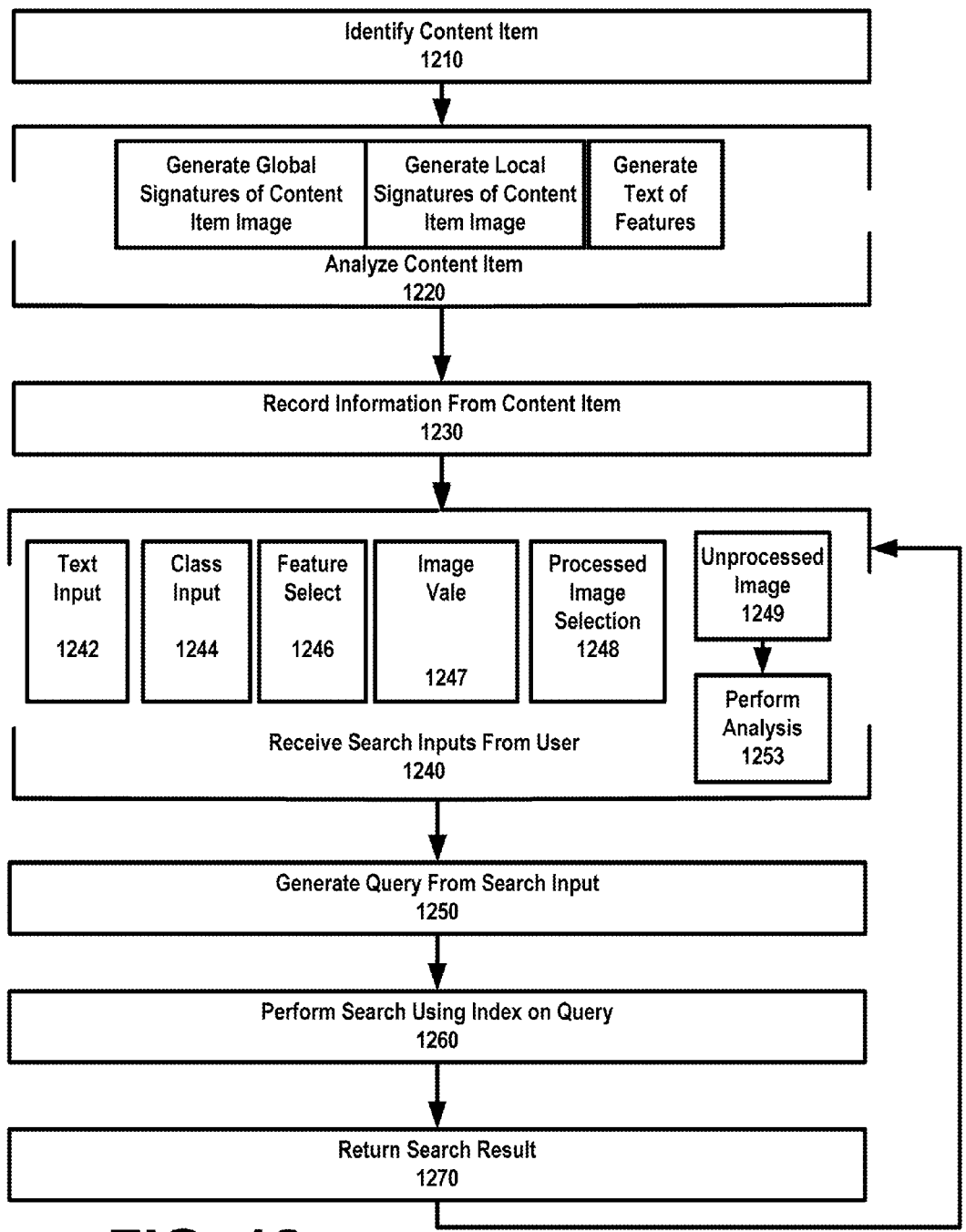
FIG. 12 illustrates a method for implementing a search system, such as described with an embodiment of FIG. 11, according to one or more embodiments of the invention.

FIG. 12 illustrates a method for implementing a search system, such as described with an embodiment of FIG. 11, according to one or more embodiments of the invention. Accordingly, reference may be made to elements of a system such as described with FIG. 11 for purpose of illustrating a suitable component or environment for performing a step or sub-step being described.

In a step 1210, content items are identified for use in aggregating searchable data. The content items may include images, text and metadata. One or more embodiments provide for the use of web content. Still further, one or more embodiments provide for the use of web content that corresponds to merchandise for sale, such as provided at numerous e-commerce site. Such content items may be stored as records and include images of an item for sale, as well as descriptive text and metadata associated with the file that is indicative or a classification and source for the content item.

While embodiments described herein make reference to e-commerce environment and images of objects that are merchandise, other embodiments have different applications. For example, an embodiment may apply a method such as described herein, or with the system of FIG. 11, in the environment of an online social network. If such an application, objects that may be recognized included clothing, apparel, and faces.

Step 1220 provides that a procured content item is analyzed as part of process to build searchable data. As described with an embodiment of FIG. 11, data resulting from analysis of content items may be stored in an index that can be subsequently searched using user-specified search criteria. Multiple types of analysis may be performed on a content item and that includes or carries an image.

In one embodiment, analysis of content items includes generation of a signature that represents a global characteristic or attribute of an object in the image of the content item. For example, the global signature of a represent a dominant of primary color, color pattern, texture, shape or other physical characteristic that is descriptive of the object as a whole. When the content item includes images of persons, for example, the global signature may correspond to a recognition of a face of the person.

As an addition or alternative, one or more embodiments provide for generation of a signature that is representative of a local feature. As described with one or more embodiments, local features may include a shape, color, pattern, or the physical characteristic of a specific portion of the object in the image.

Still further, as an addition or alternative, one or more embodiments provide for generation or identification of text and/or metadata that is included in the content item, or otherwise associate with the content item. This text may be extracted, or generated as the end result of a recognition or image analysis process. In the latter case, for example, image analysis may determine that a caller of the object in the image is a hue of orange. Step 1220 may provide for the generation of the word "orange", as a text descriptor of the content item, even though the word 'orange' is not used or carried in the content item.

In step 1230, data and information resulting from the analysis of the content item is recorded. The information is recorded in a data structure to enable subsequent searching, through use of queries that can contain one or both of text or image values or signatures. In one embodiment, the data and information is recorded in an index that correlates to a data store where the content items are stored in records.

Steps 1210-1230 illustrate to process of building searchable data using image analysis. This data may be subject to search by a user who can specify as input text, images and visual values or attributes such as color. Accordingly, step 1240 provides that a search input is received from a user. This input may correspond to any of text input 1242, class or classification input 1244, feature selection 1246, image value input 1247, processed image input 1248, and/or unprocessed image input 1249. Unprocessed image input 1249 may be followed by performance of image analysis as a sub-step 1253. Feature selection 1246 may correspond to selection of either a local or global feature, extracted from the image of the object. Image value input 1247 may correspond to specification of a physical and visual attribute, such as color, shape, pattern or texture, independent of an image being displayed. For example, the user may select items that are of the color orange. The image value 1247 input may be made independent of other image information. For example, the user may specify a color for a watch, without having an image as input. Alternatively, the image value 1247 may be inputted in combination with features or identification (e.g. through selection) of another image.

Step 1250 provides that a query is generated from the search input. The query may reflect any of the inputs described with step 1240. One or more embodiments provide for the query to include multiple components (or queries) for different inputs, or combinations thereof.

In step 1260, the queries are processed against one or more indexes. In one embodiment, different indexes or index structures are used to hold data of different kinds that result from the processing of the images.

In step 1270, a search result is returned to the user. The search result may include content that is based or derived from one or more content items that include data that match the criteria of the query. In one embodiment, records from multiple content items are displayed and combined on a single page for display to a user.

According to an embodiment, the presentation of the records may include panels that contain both images and text/metadata from the matching records. In one embodiment, a portion of the method may be re-performed beginning with step 1240, using the presentation of panels as the starting point. For example, the user may select a panel containing an image, in which case input in the form of processed image input 1248 and/or text input 1242 may be used to form the search query. As an example for an alternative or additional embodiment, the user may specify color, pattern, shape or other feature to be provided in combination (including as an additive combination) with an image returned in the result. The combination may indicate a user's desired item, as modified by the image value. For example, the user may select an items appearance, but use the image value to specify a different color.

Front End Components of Search System

Figure 13:
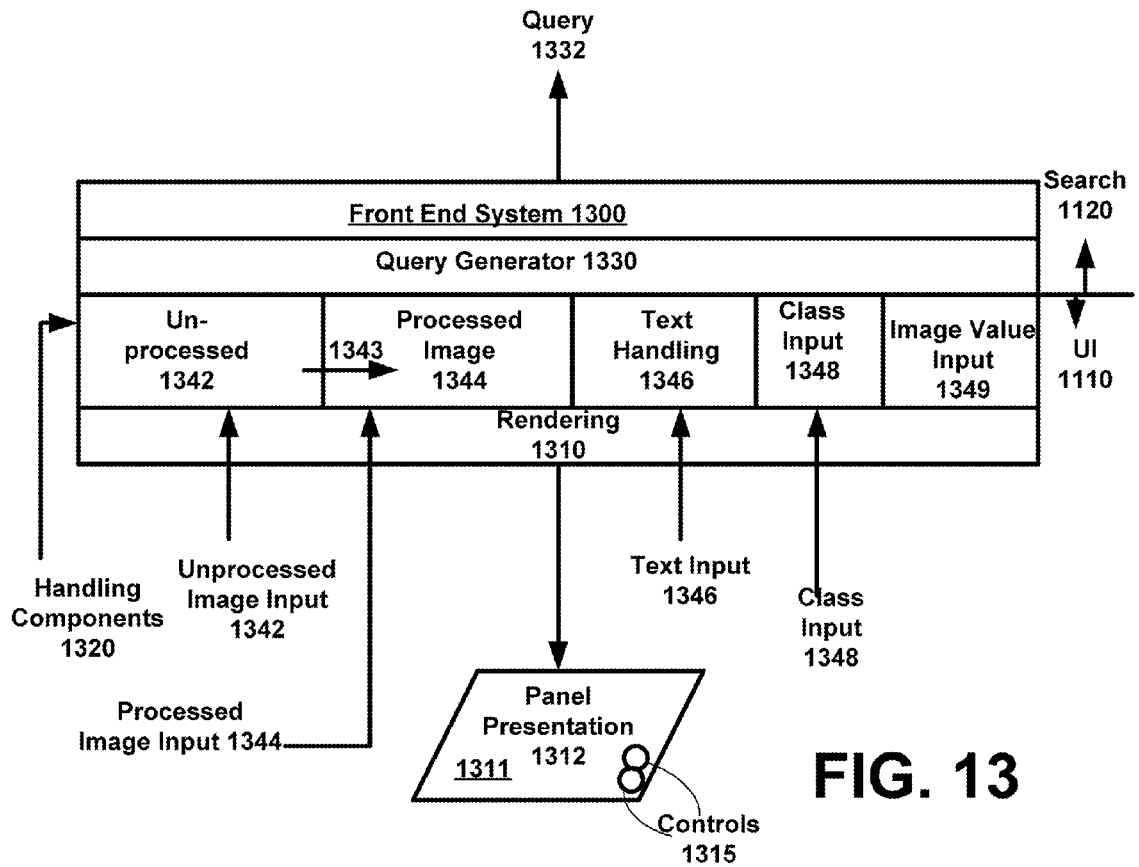
FIG. 13 illustrates a front-end system for use with an image search system such as shown and described in FIG. 11, under an embodiment of the invention.

As described with an embodiment of FIG. 11, system 1100 may incorporate a user-interface that enables the user to specify various kinds of inputs, and combination of inputs, for generating a query that can search processed image data. The user-interface 1110 and/or search module 1120 may identify criteria from the inputs, and use criteria in generating a query that can be used as a basis for identifying items from an index that satisfy the criteria of the query. FIG. 13 illustrates a user-interface for use with a search system such as shown and described with an embodiment of FIG. 11.

In an embodiment, a front end system 1300 of the search system 1100 includes the user-interface 1110 (FIG. 11). The user-interface 1110 may be comprised of a rendering component 1310, and a set of input handling components 1320. The front end system 1300 may also include a query generator 1330, which may form part of the search module 1120 (FIG. 11) and/or user-interface 1110. With regard to the user-interface 1110, the rendering component 1310 displays content and functionality to the user. At least some of the functionality may be used to enable the user to specify inputs (described as controls 1315 below) that are to form the criteria for a search query. The set of input handling components 1320 includes one or more of (i) an unprocessed image handling component 1322, (ii) a processed image handling component 1324, (iii) a text handling component 1326, and/or (iv) a class handling component 1328. As an addition or alternative, an image value handling component 1329 may also be provided as one of the set of input handling components 1320.

In one embodiment, the rendering component 1310 displays a page 1311 to the user. The page 1311 may include a panel presentation 1312, at least in response to certain actions of the user. The panel presentation 1312 may display a plurality of panels, each of which include an image and possibly text and/or content or metadata. In one embodiment, the panels of the presentation 1312 are selectable to enable the user to specify the image and/or other content of the panel as a search criteria.

In addition to panel presentation 1312, the page 1311 may include control input features 1315. In one embodiment, the control input features 1315 include a text field, an upload mechanism and one or more user-interface features for enabling the user to enter an image value. With the panel presentation 1312, and the control input features 1315, the user is able to specify as input (for a search term) multiple types of inputs, including unprocessed image input 1342, processed image input 1344, text input 1346, class input 1348, and image value input 1349.

Each selection of the panel may correspond to a processed image input 1344, and is handled by the processed image handling component 1324. The processed image input 1344 (for processed image handling component 1324) may also correspond to a selection of a portion of an object, and/or selection of an attribute or characteristic of a displayed and processed image.

The un-processed image handling component 1322 may handle a corresponding an unprocessed image input 1342. This may occur when, for example, a user-uploads or submits an image file to the procurement 1130 and/or causing the image file input to be processed by the content analysis system 1140 for data from which the search query can be formed. As an alternative or addition, the un-processed image input 1342 may originate from outside of the domain of the system 1100 and be detected or received by components (e.g. procurement) that act as the un-processed image handling component 1322. For example, one or more embodiments contemplate that a user can specify a content item, such as in the form of an image, on a third-party website and then have that image and the associated content analyzed by the content analysis system 1140 (FIG. 11). Such an input may correspond to trigger input 1134 (FIG. 11). In making the input, an implementation provides for code to execute, from, for example, the user terminal or the server of the third-party site. Execution of the code causes the content item to be forwarded to content analysis system 1140 for processing. As such, it is possible for the un-processed image input 1342 to be made without the user-interface 1110. For unprocessed image input 1342 (correspond to trigger input 1134 (FIG. 11) or user-input 1136 (FIG. 11)), one or more embodiments provide that the content analysis system 1140 returns image data results 1343. In one implementation, the resulting image data results 1343 may be quantified and/or made use of similar to values carried by selections of processed images.

As described above, the processed image input 1344 may correspond to the user entering selection input in association with an image that is displayed to the user. In one implementation, the user may view a page containing numerous panels, and make a selection of one panel over others. This selection may correspond to the processed image input 1344. The processed image input 1344 may also specify global features (e.g. dominant color) or local features through the selection input.

The control features 1315 may be used to enter image value inputs 1349, such as color, pattern, or shape. These values may also correspond to local or global image features, but they may be made independent of and/or additive to a displayed image. For example, the control features 1315 may be used to specify a color for an object that is identified by text input 1346, or the control feature may be used to modify a selection input corresponding to the processed image input 1344. As another example, a user may specify a panel or a portion of an image in a panel, then specify an alternative value of one of the attributes of the selected image (e.g. color) through use of one of the control features 1315. As another example, the user might specify text input in addition to an image input. For instance, a set of text drill downs can be presented at the side of the panel, and the initial results set can be further filtered using the text entry through drill downs.

As another example, the dominant color may be specified through a color tool that enables a user to specify a desired color on a spectrum. Similar tools may be provided for patterns, shapes and even textures. Additional or alternative features are described below with other embodiments. As an addition or alternative, one or more embodiments permit the user to specify text as a global feature.

The user may specify classification input 1148 through any one of many ways. For example, the user may enter text, select menu fields or specify or select an image. The classification input 1148 may be based on the text or menu item, or based on a classification of the object of the selected image. The class input handle 1328 may make a class designation that correlates to the classification input 1348.

As described with one or more embodiments, a user may enter text input 1346 in addition or as an alternative to the other types of input. One or more text fields may be included with the interface 1110 to enable the user to submit text. The searchable text of the index of other data structure may include text that is characteristic of an image, and programmatically determined from performing analysis or recognition of the image. For example, searchable text may include the primary colors of the object in the image, in the form of text e.g. "orange").

The query generator 1330 may convert inputs from any of the components of the user-interface into one or more queries 1382 for different indexes 1150 (FIG. 11). Individual queries 1332 to one index 1150 (FIG. 11) may combine inputs of different kinds. Specifically, one or more embodiments provide that any of the different kinds of inputs described above may be generated into one or more queries by the query generator 1330. For example, the user may specify the processed image input, or control features 1315 for color and text input. As another example, the user may select a panel image (processed image input 1344) and a color input (control 1315) to specify a desired object image and color. The query generator 1330 may be used to generate a query 1382 for different index sources. Different components of the search module may use generated queries 1382 to perform comparisons and matchings of values in the index(es) 1150.

Visual Similarity Searching

One or more embodiments provide that image data searches may be performed through use of indexes or similar data structures that enable quantifiable comparisons of values representing image attributes or appearances. In performing a visual search in which the user's input is image data, the may be required to submit or specify a visual sample. In one embodiment, the visual sample corresponds to an object image of the user's preference or specification. A similarity search may be performed using that image as the search input. The similarity search attempts to identify a set of images that are similar to a specified image.

Figure 14:
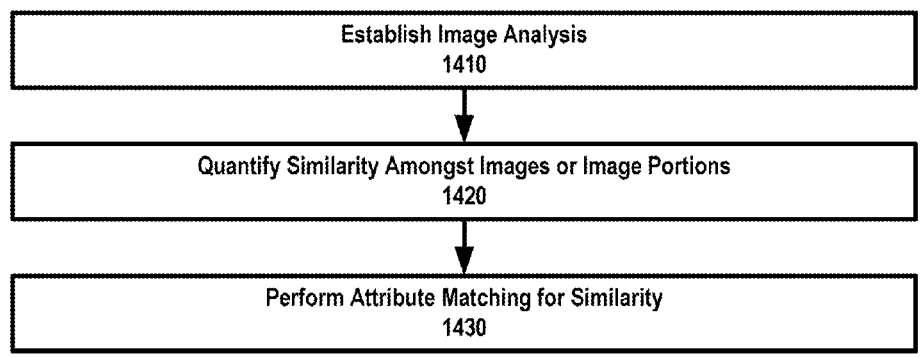
FIG. 14 illustrates a technique for enabling and performing a similarity search using an image input, according to one or more embodiments of the invention.

FIG. 14 illustrates a technique for enabling and performing a similarity search using an image input, according to one or more embodiments of the invention. A technique such as illustrated with an embodiment of FIG. 14 may be implemented with, for example, the system 1100 of FIG. 11. Accordingly, in describing a technique of FIG. 14, reference may be made to system 1100, or components thereof, for purpose of illustrating components for performing a step or sub-step being described, or alternatively for using a result of the step being described.

In one embodiment, a step 1410 establishes image similarity data for subsequent searches, in which techniques used to implement image similarity measurements are at least initially determined from human judgments. Similarity distances are employed in content-based image retrieval (CBIR) systems in order to retrieve images similar to user-provided queries. Implementing methods measuring image likeness is a challenging task as perceptual similarity is often subjective and task-dependent. For example, a criterion for measuring similarity in an image taken by a consumer level digital camera in a natural environment is different from the criterion of similarity for professional and staged images of products or merchandise such as jewelry.

Step 1420 provides that similarity amongst images or image portions may be quantified relative to a set of assumptions using distance measurements. Several distance functions have been used in the past to measure the similarity of images with respect to specific visual attributes. The specific visual attributes include color distribution, texture, or object shapes. One or more embodiments described include some of these distance functions, as well as features in the preceding sections. An embodiment described includes methods that translate such low-level feature distances into a measure of perceptual similarity capturing the intent of the user search input. The search input may be provided from the user through, for example, execution of the user-interface 1110 (FIG. 11) and search module 1120 (FIG. 11). One or more embodiments provides for computer-learning of these distance functions from a training set of user similarity judgments.

Step 1430 includes attribute matching, for purpose of measuring similarity of images with respect to a specified visual attribute (e.g. color). The output of each attribute matcher is a numerical value measuring the distance (dissimilarity) between two images with respect to a specific visual feature. Such measure are termed as "feature distance".

One or more embodiments include methods to map a set of feature distances into a single perceptual similarity measure. This computation may be cast as a regression problem in which the goal is to predict the perceptual similarity values from a set of observable feature distances. As mentioned earlier, such a similarity measurement may embody a likeness criterion that is dependent on the purpose of the image retrieval task. This regression model may be modeled after human similarity observations reflecting the user intent.

In one embodiment, perceptual observations are collected by asking subjects to quantify the degree of perceived similarity of images, for example by providing likeness values between 0 (opposite) and 1 (identical). Rather than requiring subjects to inspect image pairs at random, in this document one or more embodiments include an approach aimed at speeding up or enhancing the perceptual data collection. Since similar images are few in number as compared to images that are different from one another, the process of acquiring human judgments with high value of likeness is generally more time-consuming than the task of collecting dissimilar images. One goal may be to use the feature distances to identify image pairs likely to be declared as similar by the subjects. Specifically, for the purpose of collecting observations of highly similar images, only pairs having small feature distances are shown and evaluated by users. The highly similar images may be displayed to the user in the form of panels, cascaded so that numerous similar images are displayed at once. Similar to the techniques discussed with manual enrichment, the cascade manner in which panels are presented enables the use of manual feedback and input from operators to move quickly.

In another embodiment, users might define partial orderings over sets of images with respect to similarity to given queries. In one embodiment, this framework can be used to combine multiple feature distances. In another embodiment, a perceptual mapping from each feature can be made separately by using this framework.

Several machine learning algorithms may be applied to learn similarity measures from the sets of perceptual observations. In its simplest form, a linear least square regression can be used to learn a linear function of feature distances predicting the similarity distances from the training set of perceptual values provided by the users. In another embodiment, a logistic regression can be employed instead of a linear one. One of the advantages of logistic regression is that it can restrict the output values to any desired range, while traditional linear regression is unable to do so. More powerful prediction models can be obtained by applying the regression algorithms to higher-dimensional feature vectors computed from the original feature distances. For example, polynomial kernels can be used to compute nonlinear features of the inputs. Classification algorithms can also be used to estimate similarity values from the feature distances. The user-provided perceptual judgments ranging in the interval [0,1] can be interpreted as probabilities of membership to classes "similar" or "dissimilar". These probabilities can be used as input to train binary classification methods, such as support vector machine or boosting.

In another embodiment, a weighted combination of the feature distances are used. For a query image (Q) and a database image (D), one or more embodiments use the following formula to measure their overall dissimilarity:

$$\text{TotalDistance}(Q,D) = \text{sum}(\text{Distance}(Q,D,i) * w(i)), i=1, 2, \ldots, N \quad (1)$$

where N is the number of features, Distance(Q,D,i) is the Feature i's distance between Q and D. w(i) is the weight assigned to Feature i.

A determination may be made as to weights w(i) that can be applied to the distance function. Such a determination may be made as follows. First, distance vectors for both similar image pairs and dissimilar image pairs are calculated. "Similar" and "Dissimilar" may be defined by a given set ground-truth data, Human operators may be used to determine if a pair of images are relevant to each other or not.

For similar image pairs, a target function is 0 for distance vector:

[Distance(x,y,1), Distance(x,y,2), Distance(x,y,3), . . . , Distance(x,y,N)]

For dissimilar image pairs, a target function is 1 for distance vector:

[Distance(x,y,1), Distance(x,y,2), Distance(x,y,3), . . . , Distance(x,y,N)]

From this determination, weights w(i) may be optimized by making the vector value TotalDistance(x,y) sufficiently close to the target for the selected distance vectors. In one embodiment, Linear Discriminant Analysis (LDA) can be used for this purpose.

As it is time consuming to calculate the distance between the query image and the each image in the database for all the features, one or more embodiments provide for a technique that uses one primary feature to identify an initial candidate set (for example, 10% of all the images in the database), and then use all the features to do a final match. In this way, an embodiment can perform the matching at a faster rate, with very little accuracy loss.

Figure 15A:
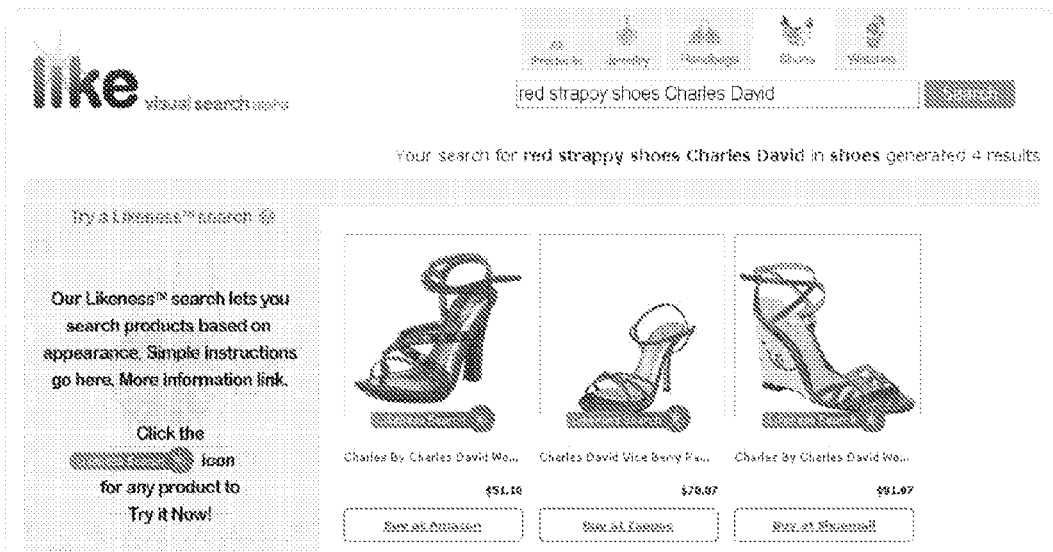
FIG. 15A illustrates an implementation of a text search performed to view images of merchandise items, under an embodiment of the invention.

FIG. 15A illustrates an example of a text search result on shoes. The user can then choose one of the shoes and run an image similarity (likeness) query on it.

Figure 15B:
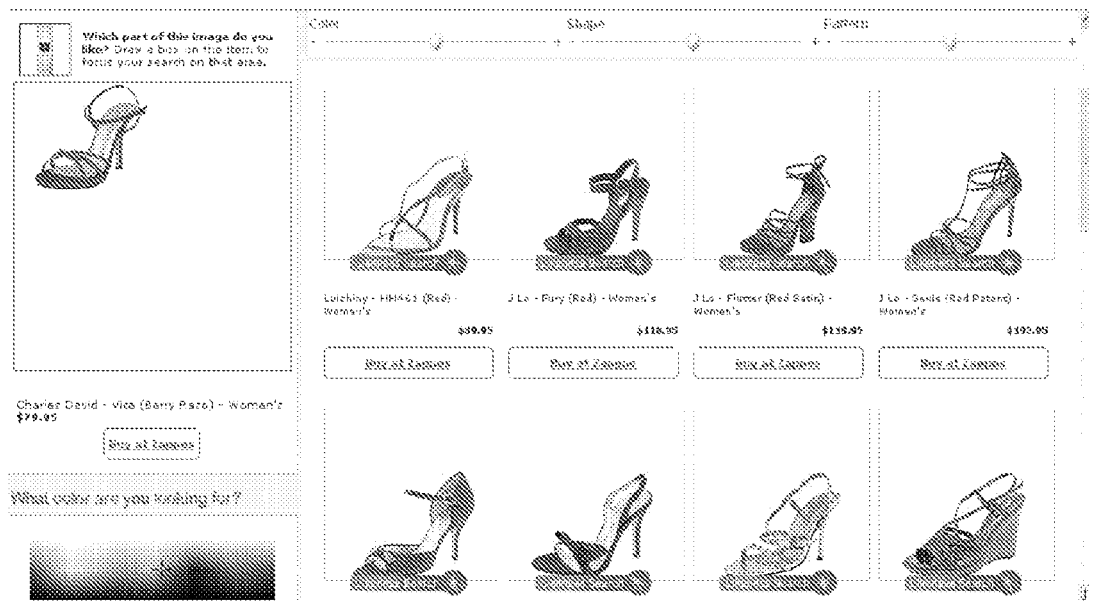
FIG. 15B illustrates results of a similarity search for the same merchandise item, under an embodiment of the invention.

In contrast, FIG. 15B illustrates an example of similarity (likeness) search results on a shoe. The results match the query image with a combination of color, shape, and texture.

User-Interface Controls

One aspect of searching images with image input (or content based image searching) is that results can significantly vary as between user expectations and programmatic implementation. Accordingly, one or more embodiments recognize that user-feedback, responsive to search results with image criteria, can provide a valuable resource in enabling a user to specify a desired visual characteristic of an object. As such, one or more embodiments provide for use of feedback mechanisms that can be used by individuals to specify color, shape, pattern or other image values that are characteristic of an object's appearance.

In one embodiment, a user's search result is accompanied by various mechanisms to that enable the user to provide feedback. Graphic user-interface features for providing feedback may include any one or combination of (i) sliders, (ii) color pickers, (iii) location region selection, and/or (iv) drill downs.

A slider is a graphic-user interface feature that is moveable by the user in a linear fashion to enable a user to specify a value between a minimum and a maximum. One or more embodiments enable a user to use one or more sliders 1610 in order to select color (e.g. by presenting color values for one or more hues in a spectrum linearly), shape or a pattern as a characteristic of focus in providing a result or modifying an existing search result. An example of a slider is shown with an embodiment of FIG. 16.

A color picker enables the user communicate a specific color for purpose of receiving a result or modified search result that contains objects of the selected color. An example of a color picker 1710 is shown with an embodiment of FIG. 17.

Figure 18:
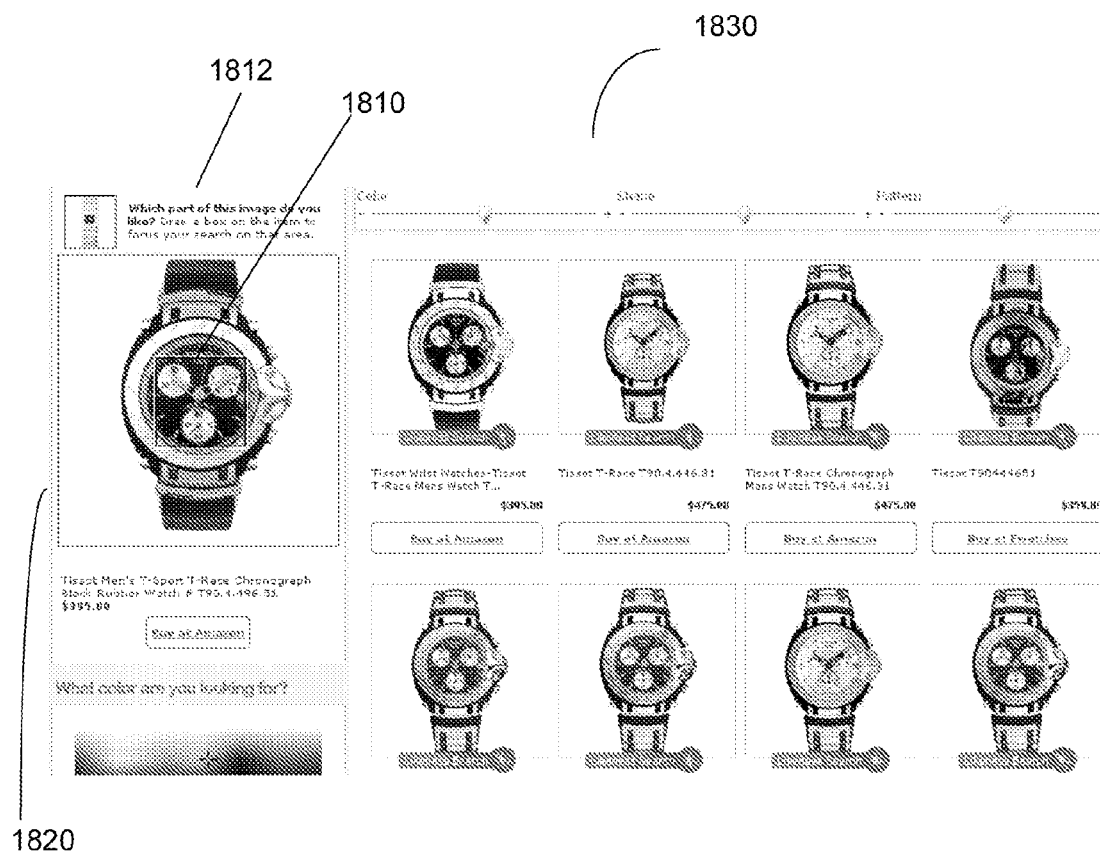
FIG. 18 illustrates implementation of a selector graphic feature for enabling a user to select a portion of an image of an object, according to an embodiment of the invention.

The local region selection enables the user to specify input that selects a portion of an image of an object as input. As a result of the input, the system focuses processing (e.g. query generation and matching) on the selected part of the image. A resulting search result may achieve results that are similar to the particular region. An example of a selector graphic feature 1810 for enabling the user to make the local region selection is shown with an embodiment of FIG. 18. The feature 1810 may be graphic, and sizeable (expand and contract) over a desired position of a processed image 1820. In the example provided, a rectangle may be formed by the user over a region of interest of the image-that being the face of a watch. An accompanying text 1812 explains use and operator of the feature 1810. Results 1830 include items of the same class, with the localized selected feature being considered similar in likeness of or as a match.

A drill down feature enables the user to provide pre-formulated text queries or classification identifiers to filter or modify a search result. For instance, the user can specify text input of "open toe" for the object of a shoe, and an existing search result may filter to remove content items that are processed as being "open toe".

With regard to sliders, one or more embodiments provide for use of sliders in the client-side relevance feedback (RF) for a system that enables content-based image retrieval, such as described with an embodiment of FIG. 11. Graphic user-interface features such as sliders allows the end user to continuously change key parameters by adjusting a position of a bar or similar graphic feature. The position of the bar connotes a value, such as proximity or similarity in appearance. Manipulation of sliders enables a search result to be modified. In one embodiment, the modification is responsive and almost instant in response to the bar or feature being provided a new position. Compared with conventional server-based relevance feature mechanisms, one or more embodiments enable the end user to more easily find desired images while reducing computation load on a central server or computer system.

One or more embodiments further recognize that image searching systems such as described with an embodiment of FIG. 11 can have difficulty returning the best or most relevant search results with just a single query image or input form the user. For example, a user may be interested in the color, the texture, a certain object, or a combination of multiple factors. One or more embodiments enable the user to interact with a system and its search results, in order to enable final search results which are closer to what the user has in mind.

Furthermore, one or more embodiments contemplate that in a network or client-server architecture, a user's feedback parameters on a client side terminal (usually a Web browser now) result in the feedback parameters being communicated to a remote server. In such an environment, a remote server reprocesses a query based on the feedback and sends back an updated search results for the client terminal. Such round trip on a network may include latency issues, which may limit or hinder the user in providing the feedback to the search results. In one embodiment, together with the initial search results, the server also sends additional information to the clients. In the current embodiment, the additional information includes the distances between the query image's individual features and the selected nearest neighbors' individual features.

The user may then change key control parameters. Based on the additional information cached at the client terminal, the query results can be very efficiently updated at the client side with limited or no involvement of the remote server. The update speed can be fast enough to support seemingly continuous parameter change and corresponding instantaneous query result updates, so that the user can more readily view a most relevant search result.

In one embodiment, for the initial query, the system uses Linear Discriminant Analysis (LDA) to combine many image features (as described under feature extraction) using weighted summation.

Distance(Query,Example)=sum
(weight$I$*DistanceFeature$I$(Query,Example)),
$I$=1,2, ..., $N$ Statistically, it has been shown that the weights lead to very good accuracy on general images. However, as expected, the weighting is not optimal for all images.

Figure 19:
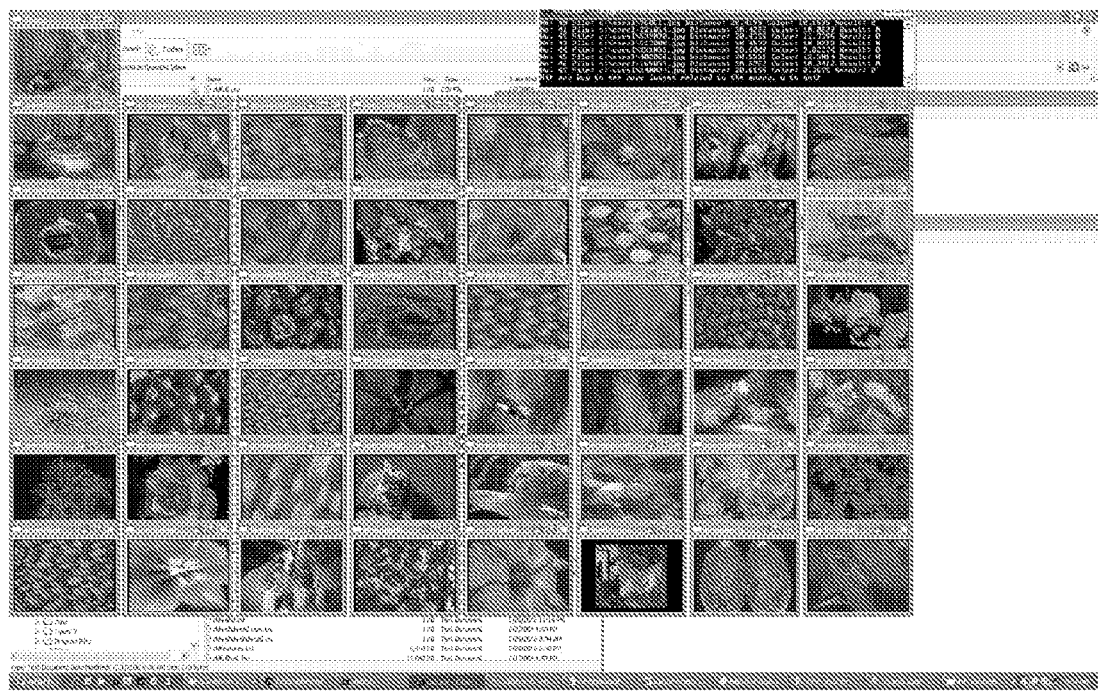
FIG. 19 shows an example of how image features may be combined in a query, under an embodiment of the invention.
Figure 20:
FIG. 20 illustrates an example of a result that may be achieved through a user-interface feature, according to an embodiment of the invention.

FIG. 19 shows an example of how image features may be combined in a query, under an embodiment of the invention. In an example shown, an original query results in a cat image. Due to the weighting on color features, only two cat-related images appear in the 48 panels that comprise the search result. An embodiment performs relevant feedback as follows:
(i) Collect the DistanceFeatureI(Query, Example) for the first K NNs of the original query results. So here is K*N distances.
(ii) Group the features into multiple categories: color features, shape features, pattern and metadata features, etc. For each example in the K NNs, multiple distances are determined that correspond to color, shape, texture and metadata respectively.
(iii) Allow the user to almost continuously change the weighting between the distances by the use of sliders. The new NNs are selected according to the new slider weights:

New Distance=w1*ColorDistance(Query, Example)
+w2*ShapeDistance(Query, Example)
+w3*TextureDistance(Query, Example)
+w4*MetadataDistance(Query,Example).

Where w1 through w4 are the weights obtained through the sliders. The result after increasing the pattern features are provided in FIG. 20. It can be observed that many other cat images are included in the results.

Figure 16:
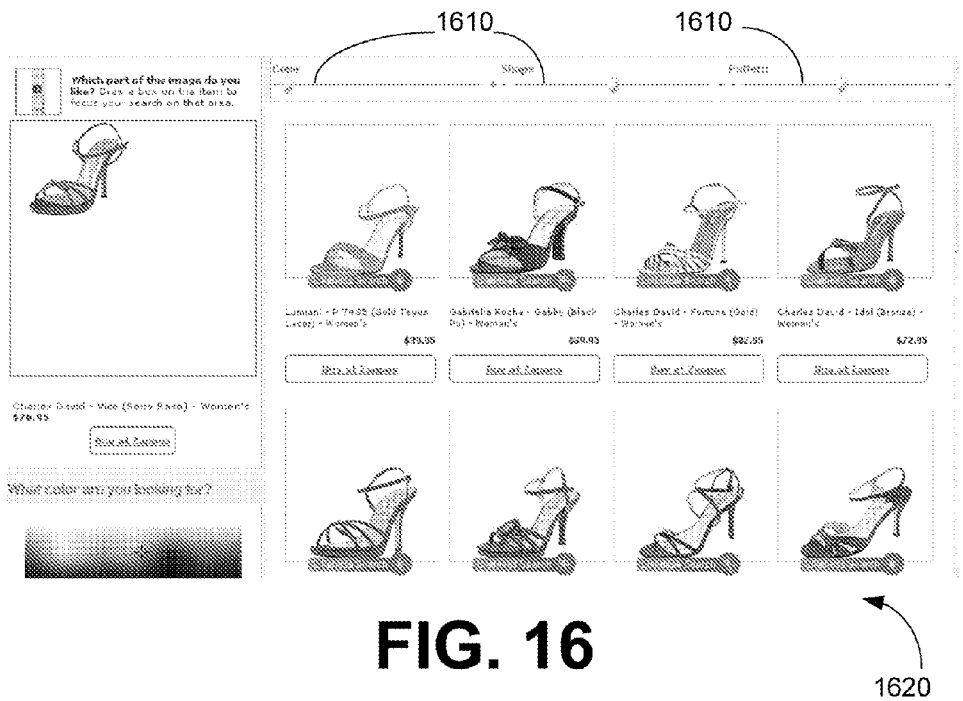
FIG. 16 illustrates a slider feature for a user-interface, according to an embodiment of the invention.

With further reference to FIG. 16, another example is shown of how image features may be used or quantified in a query, according to one or more embodiments of the invention. In an embodiment shown, the user views a result 1620 comprising similar shaped objects having different colors. This is a result of the color slider 1610 being minimized. By reducing the weight of the color, the user is able to get similar shape and patterns.

Figure 17:
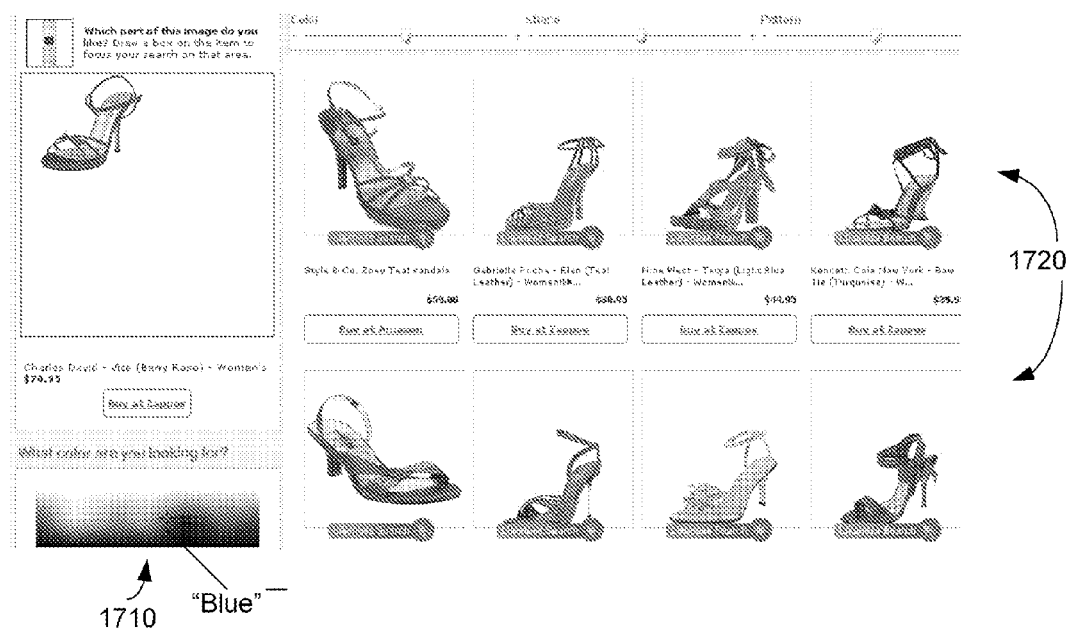
FIG. 17 illustrates a color selector feature for a user-interface, according to an embodiment of the invention.

With further reference to FIG. 17, a color picker relevance feedback mechanism may correspond to a user-interface feature that is used to give the user the ability to choose a particular color. Once the user chooses a color, the color features of the query image is swapped with the color of the picked color. Then a global image similarity search is applied on the database. In one embodiment, a weighted combination of the user selected color and the query color are used. The result 1720 is of items that have a same or similar classification, and a global color feature that is matching or most similar.

The color picker 1710 search may thus focus on shape, texture and the metadata features from the original query image, while swapping or reweighting the color features with the color that the user has picked. As a result, the user may receive items with similar shape, pattern and metadata to the query item, but with the color that the user has selected. FIG. 17 provides an example where blue was selected by the user. The shoes start matching the query image in all aspects but the color, and the color of the returned query items are blue.

As described, a local search relevance feedback mechanism corresponds to a graphic user-interface feature that enables a user to select a region of interest from a processed image, under an embodiment of the invention. The processed image may be one that is provided or returned with a search result. As described in the Feature Extraction Section, the features for local regions are calculated prior to search time. When the user selects the region, the system uses the features extracted specifically around that region. Then the matching happens using the selected region's features. In one embodiment, only the local features are used for matching. In another embodiment, a weighted combination of global and local features is used. Still further, a cascade of features' matching can be used. For example, the first pass is made using some of the global features, and the second pass can be made using the local features. With further reference to the local feature search shown in FIG. 18, an embodiment illustrates a scenario in which watches with three chronographs are returned as a search result.

With regard to drill down relevance feedback, metadata is essential for allowing users to narrow a similarity search. The user interface can allow the user to select a particular buzzword (as described in preceding sections), or brand of an item, and filter the result set to only those items containing the buzzword. The buzzword sets described previously in this section can be employed to group the relevant buzzwords, and display them more intuitively on the screen. In addition, only buzzwords related to those that are present in the query item can be shown to un-clutter the interface. Using these text drill-downs, the user can then limit a similarity search result to the results that only contain a particular word or phrase.

E-Commerce System

Any of the embodiments described herein may have applications to electronic commerce. More specifically, with reference to FIG. 1, one or more embodiments provide for the use of an image analysis system in which content items include commercial content containing images of merchandise and products for sale. E-commerce content items include records stored at online sites. Such records are often assembled on-the-fly, in response to search request. Generally, commercial online content provides for records that have images, text, and links to a site or to other content items.

Figure 21:
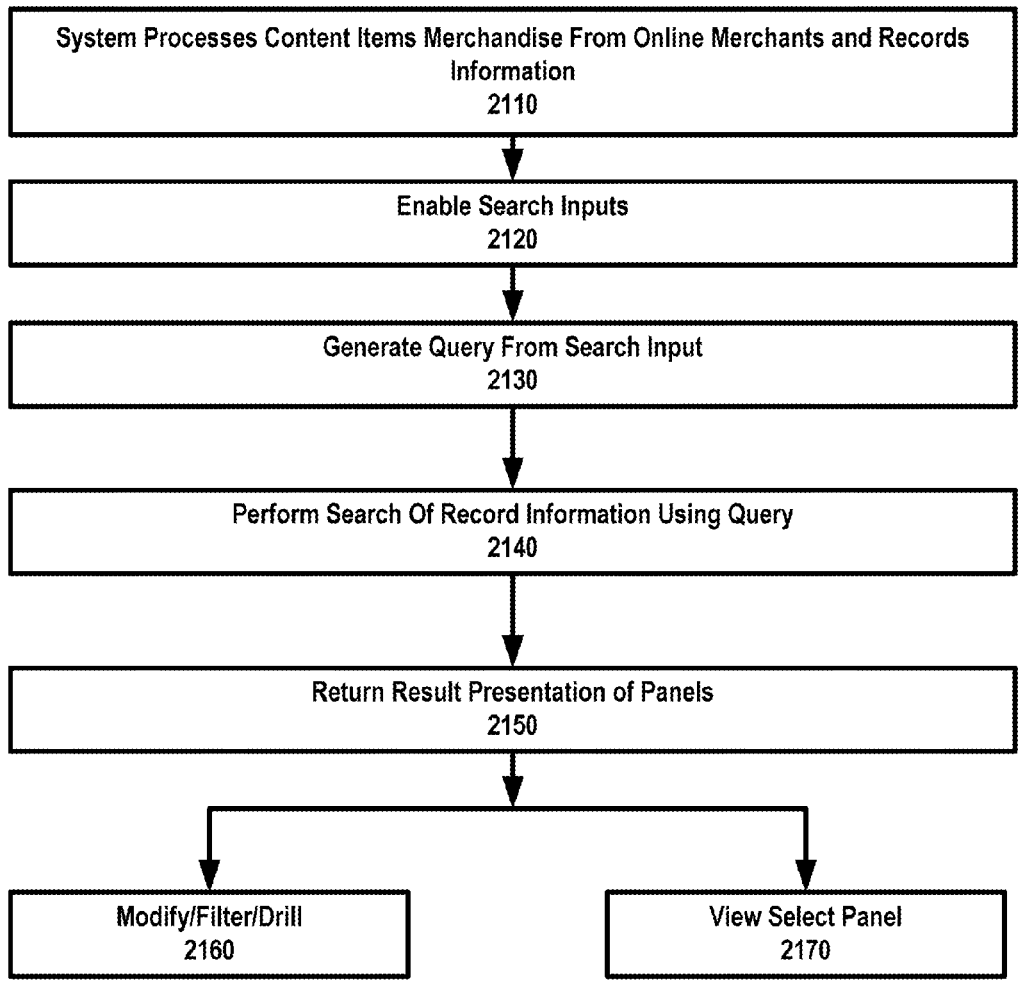
FIG. 21 illustrates a method for implementing an e-commerce system using any combination of embodiments described herein, according to another embodiment of the invention.

FIG. 21 illustrates a method for implementing an e-commerce system using any combination of embodiments described herein, according to another embodiment of the invention. A method such as described with FIG. 21 may be used to in connection with a system for analyzing content items and/or using images or image data or values, for purpose of assisting individuals in identifying content items for merchandise. Specifically, an embodiment such as described enables an individual to use image searching and analysis in a commercial environment. As such, a method such as described with FIG. 21 enable an individual to search for merchandise using visual characteristics and appearances of the object of interest.

In embodiment, FIG. 21 may be implemented on a system such as described with FIG. 11 (using components and elements described with other figures herein). Reference to elements of FIG. 11 may be made for purpose of illustrating a suitable element or component for performing a step or sub-step being described.

In a step 2110, content analysis system 1140 processes content items that carry images and description of merchandise. Examples of merchandise include clothing (shirts, pants, hats, jackets, shoes, ties), apparel (purses, sunglasses), carpets, furniture (sofas, lamp shades, furniture covers), and watches and jewelry. Content items may be hosted or provided at other sites, including online commerce sites, and auction sites. The content items may include one or more images of the content item, as well descriptive text and/or metadata of the item for sale. Typically (but not always), images provided for an item for sale are focused on only the particular item, and do not carry non-related objects.

Step 2120, various kinds of search inputs are enabled for a user's submission. As described with, for example, an embodiment of FIG. 13, a user-interface 1110 (FIG. 11) may enable search input from a user to specify text, un-processed images, processed images, image feature values such as color, classification input, or a combination thereof. As part of enabling the search inputs, the index 1150 may store index data that holds the analyzed images of the merchandise content items in a searchable form.

Step 2130 may be performed at run-time. In step 2130, one or more queries are generated from the search input. One or more queries may include one or more criteria that is specified by the user.

Step 2140, record information is searched based on a criteria identified in the query. In one embodiment, the index 1150 is searched for content items that satisfy the criteria of the query.

In step 2150, a search result is returned in the form of a presentation of panels. Each panel in the presentation may include a processed content item, containing a processed image and/or accompanying text for the content item.

With the return of the search result, one or more embodiments provide that the user may either (i) filter, modify or drill down the search result (step 2160), or (ii) view a content item in more detail (step 2170). With regard to step 2160, the user may be provided user-interface controls in the form of a slider (for color, pattern, shape etc), color picker, local region selection, and drill-down features. The features may be used to refine or modify the user's search, in a manner such as described with embodiments provided above.

With regard to step 2170, the user may carry steps out to access the site or network location where the item is for sale, and purchase the item from the search result.

Figure 22:
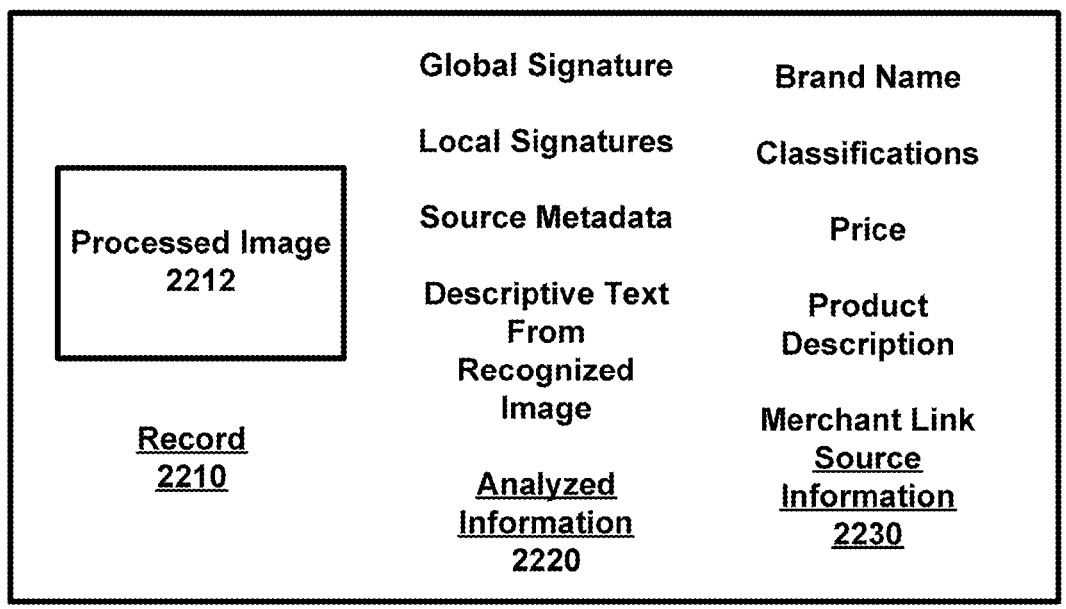
FIG. 22 illustrates a record corresponding to a processed content item having data items that are determined or used in accordance with one or more embodiments described herein.

FIG. 22 illustrates a record corresponding to a processed content item having data items that are determined or used in accordance with one or more embodiments described herein. A record 2210 such as shown may be stored in, for example, the record data store 1160, for use with front end system 1300. In an e-commerce application, record 2210 may include information processed, carried and/or derived from a content item relating to merchandise.

In an embodiment, record 2210 includes a processed image 2212 that has undergone recognition or processing, such as provided by system 100 (FIG. 1) or content analysis system 1140 (FIG. 11). The processed image 2212 may be selectable to be enlarged, and portions of the image may be selected apart from other portions for purpose of enabling localized searching. The record 2210 may also include a set of analyzed text and metadata 2220, which may be derived from, for example, the global or local signatures, the source metadata, the descriptive text provided with the unprocessed content item, and the processed image.

Source information 2230 may also be included in relatively unanalyzed or unmodified form. This information may carry or include the brand, the classification (as identified at the source), the price, an original product description, a merchant link and/or one or more product reviews.

Information from record 2210 may be displayed as part of a result presentation to a user. The user may select the record (by selecting the corresponding panel from the presentation) and either (i) modify, filter or redo the search result, or (ii) select to view the information about the merchandise represented by the content item. In the latter case, the user may select the link to view the content item at the source or at the site of the merchant, where the product can be purchased. In order to modify or filter the search result, the user may select a portion of the processed image 2210, or input text, or input one of the image value controls that modify visual/physical attributes displayed with the processed image 2210.

Network Retrieval

While some embodiments described herein provide for analyzing images of content items and storing the determined information in a searchable system of records, embodiments described herein provides for processing and use of images that are not inherently for use in commercial transactions, and are created with alternative purposes (such as to entertain or to inform). Such websites and content may be outside of the control of the system where image recognition analysis is performed. Unlike e-commerce sites, the contents of such web pages may lack conventional standards or rules. Moreover, there may be much randomness in what content is displayed on such websites or with the web content.

Accordingly, one or more embodiments may be applied to content items that are retrieved from web pages or other web content, where little advance information is known about the contents of the webpage or content. For example, embodiments may retrieve content form websites that provide news or gossip about persons of general interest to the public. As described, images from such content may be pre-processed or processed on-the-fly by embodiments described herein to enable users to specify an image or a portion of an image as a search criteria. In particular, an object of the image or portion thereof may be specified as search criteria for searching for similar merchandise items. Rules of similarity or likeness searches may be applied.

According to an embodiment, one or more remote web pages are accessed to retrieve content on display. Information is determined about an object shown in a am image of the content on display. At least a portion of the object shown in the corresponding image is made selectable, so that its selection is associated with the determined information. A selection is detected of at least the portion of the object in the image, using the determined information.

In another embodiment, a system is provided that includes a retrieval component and one or more modules. The retrieval component is triggerable by activity at a remote web page to retrieve content on display at the remote web page. The one or more modules are configured to identify one or more objects in the one or more images of the content on display. The modules determine whether the objects are of a class that are designated as being of interest.

Still further, another embodiment provides for accessing a remote web page to retrieve an image on display. The image is analyzed to detect a person shown in the image. One or more of a clothing, apparel, or jewelry worn by the person shown in the image is identified. A portion of the image corresponding to that detected object is then made selectable, so as to enable a person viewing the web page to select, for example, an item of clothing from a person appearing in the image. With selection of the portion of the image, information may be displayed about the item, including information determined from a visual search of the item. While such an embodiment is specific to items related to a person (e.g. clothing), numerous other kinds and classes of items may be detected in the alternative. These include, for example, items of home decor (e.g. furniture, carpets, drapes, utensils or dishware), machinery etc.

Furthermore, an embodiment such as described may include numerous e-commerce applications. For example, clothing on an image of a celebrity may be segmented and made selectable when the image is displayed on a blog. Viewers may select the clothing from the image, and see (i) a link or information where the item or an item closely resembling it can be purchased, or (ii) have a visual search performed that compares the characteristic of the selected item to other items of a same class.

With embodiments described herein, the term third-party or remote means a person, party or location that is outside of the domain or administrative control of another system or entity.

Figure 23:
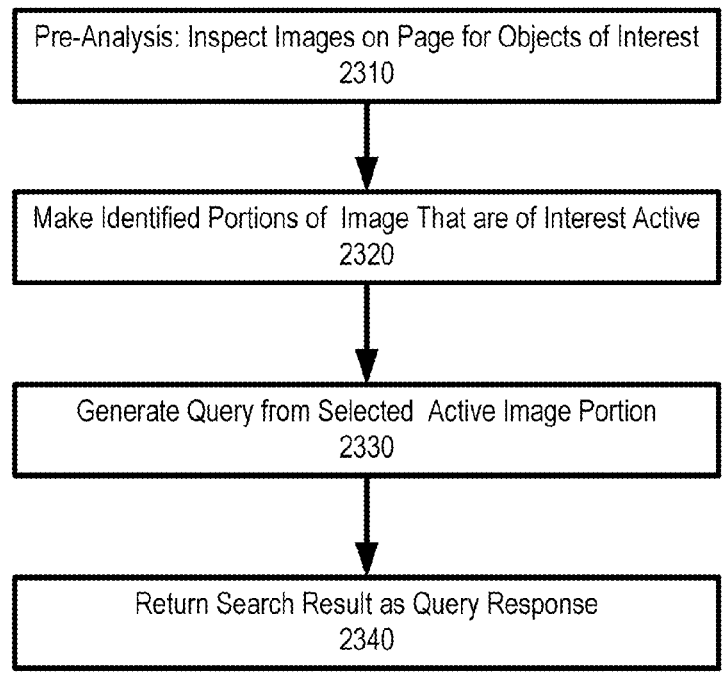
FIG. 23 illustrates a method for using remote web content for purpose of identifying search criteria for performing an image search or combination search, according to one or more embodiments of the invention.

FIG. 23 illustrates a method for using remote web content for purpose of identifying search criteria for performing an image search or combination search, according to one or more embodiments of the invention. A method such as described with an embodiment of FIG. 23 may be performed using modules and components described with other embodiments of this application. Accordingly, reference may be made to such other modules or components for purpose of illustrating a suitable component for performing a step or sub-step.

In an embodiment, a step 2310 provides that images on a page of a remote site are analyzed or inspected for objects of interest. In an embodiment, objects of interest correspond to merchandise items, such as items of clothing or apparel. More specific examples of items of interest include shirts, pants, shoes, necklaces, watches, ties, skirts, dresses, hats, purses and backpacks. Numerous other items may also correspond to objects of interest, including, for example, houseware items (dishes), plants, animals and people.

Step 2320 provides that identified portions of images that are determined to be objects of interest are made active. Active image portions of an image may act as visual links. A person may view the image and select an entire object of interest by selecting a region of the object (e.g. through movements of a computer mouse or pointer). Active image portions detect selection input, or partial selection input (such as when a pointer hovers over a link). The web page or other resource provided with the viewing of the page may associate an operation or set of operations with the selection (or pre-selection).

In step 2330, selection of an active image portion results in a query being submitted to a visual search engine. The visual search engine may correspond to any image search system, such as one described with an embodiment of FIG. 11, configured to handle content items submitted on-the-fly. The query may identify the active and selected portion of the image.

In one embodiment, the image portion that is selected is pre-designated an identifier that is provided in the query. In another embodiment, features of the active image are identified from data stored with the page or elsewhere. These features are then used in the query. Still further, another embodiment provides for use of a visual signature of the image portion, which may be provided in the query. The signature may be provided on the web page or elsewhere. For example, the image portion may be associated with an identifier that is used to retrieve pre-determined image signatures or features, then the signature/features are included in the query. In the case where the web page is pre-processed (see e.g. embodiment of FIG. 24), one or more embodiments provide that the query simply identifies the image for the backend system (e.g. content analysis module 1140 of FIG. 1) Data for performing the search may be performed by retrieving identifiers of the image (using the image identifier) on the back end.

Still further, one or more embodiments provide that features or signatures of the image are determined on the fly-in response to the selection action determined from the user. Such an embodiment may utilize, for example, modules of system 100, such as the segmentizer 110 and feature extraction module 120.

In addition to using data from or associated with the image, one or more embodiments provide for the viewer to submit additional data that formulates the query. In one embodiment, the viewer can select an image portion (e.g. a shirt). In response, software enables the user to specify additional information, such as through a software-generated window on which the user may enter text. The user may seek to provide text that describes or classifies the object further (e.g. "woman's blouse"). As an addition or alternative, the user may specify color, either visually or through text, if, for example, the viewer is interested in the item but would prefer another color. For example, any of the user-interface features described with embodiments of FIG. 15A-FIG. 19 or elsewhere may be provided to weight one or more characteristics of the image being displayed, or to otherwise supplement or modify characteristics of that image.

As an alternative or additional embodiment, the query may also identify the domain from which the user viewed the images.

In response to the query, step 2340 provides that the visual search engine returns images of objects that correspond to or are otherwise determined to be similar in appearance or design or even style, as the object of the user's selection. According to an embodiment, the result may display images that are linked to e-commerce sites or transaction locations. Thus, if one of the results interests the user, the user may select the result of interest and be directed to an e-commerce site or location where he can purchase the item provided with the result.

As described with, for example, an embodiment of FIG. 11, the visual search engine may maintain a database of images, where images in the database have the following information stored: (i) a URL to identify where the image comes from (e.g. an e-commerce site), (ii) a visual signature resulting from, under one embodiment, a separate recognition process, (iii) metadata, including descriptive text. The visual signature may be in the form of a class-specific signature. More than one signature may be maintained. As described with, for example, FIG. 7-10, the signatures may include data that describes or represents global or local features (including color, pattern, and shape). Metadata may be programmatically or manually generated based on color, shape, type of object or other descriptive markers (e.g. manufacturer of a pair of shoes).

When the query is received, the identifiers provided or identified by query are referenced against the database to determine the search result. The identifiers may include signatures of the object identified by the image portion, either provided in the query or determined through data contained in the query. The text or other features provided by the user at the time of selection may be referenced in the database as well. Under one implementation, some weighting or rule based algorithm may be used to value text entry with the image signature of the selected object. For example, user-specified text entry may be used as a required qualifier, and the visual signature of the selected image may be used to search in the class of images that satisfy the qualifier.

As an addition or alternative, information about the domain from which the query was generated may be used to further refine or specify the criteria of the query. For example, certain domains may be known to be of interest for a particular type or class of objects (e.g. shoes and handbags). When the query is generated from that domain, the visual search engine may map the domain to a set of criteria (e.g. text criteria) for use with that domain. As with user-submitted additional data, the criteria determined from the domain mapping process may be used as part of a weighted or rule based algorithm.

Figure 24:
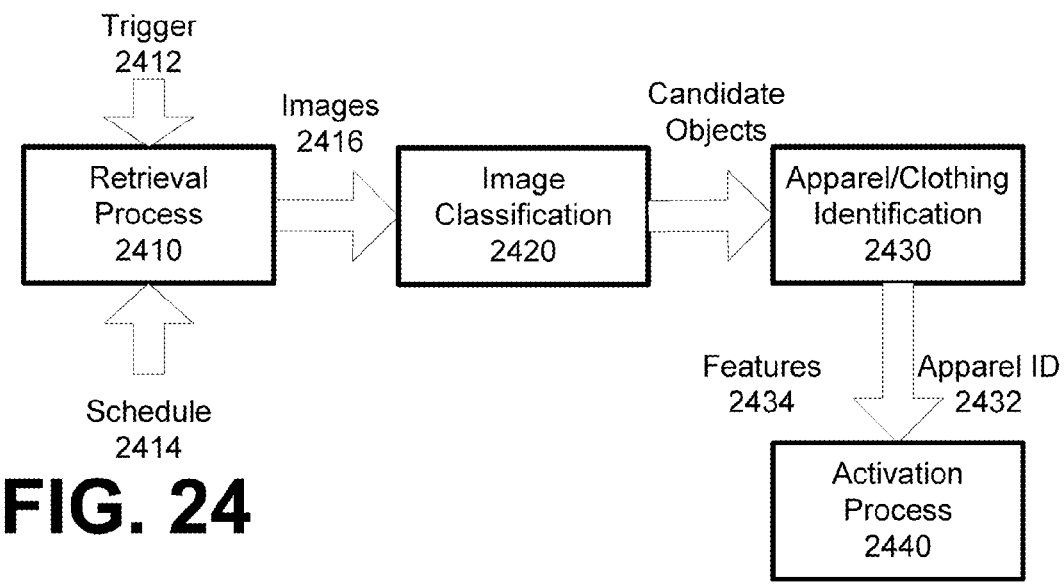
FIG. 24 illustrates a back end process for activating images on a web page, under an embodiment of the invention.

As described with FIG. 24, one or more embodiments provide that the objects of interest correspond to apparel or clothing of persons. The following provides an example. A user may view a pair of shoes worn by a celebrity at web page and be interested in the shoes. Embodiments described with FIG. 1 and elsewhere in this application enable the person to select the portion of the image that has shoes (the object of interest). Once selected, a search result is provided to the user based on characteristics or appearance of the shoes. In one implementation, the search result may be of shoes that match or are similar in appearance or otherwise to the shoes of interest. However, in other embodiments, the search result may return different objects that have a similar appearance or style to the selected object of interest. For example, some or all of the search result may include a blouse or shirt that has a similar pattern or color as the shoes of interest.

FIG. 24 illustrates a back end process for activating images on a web page, under an embodiment of the invention. The backend process may be implemented using components, modules and techniques described with other embodiments, such as with embodiments of FIG. 1. Each of the processes described in an embodiment of FIG. 24 may be performed by corresponding components or modules, or incorporated in functionality described with one or more embodiments described elsewhere in this application.

Initially, a retrieval process 2410 is performed to retrieve images of a webpage for analysis. The retrieval process may be programmatic, manual, or a combination thereof. A webpage at a given network location or site may be accessed, and its images identified. In one embodiment, a trigger input 2412 is provided to cause the retrieval process to be performed for a web page.

In one embodiment, the trigger input 2412 is provided by a webpage subscribing to a service implemented in association with the retrieval process. As part of the process, an operator of the webpage may employ a script file that is incorporated into the web page or in connection with an object on the web page. In this way, the script file may serve as a triggering component. Each time the web page is downloaded by a user, the script file signals the retrieval process 2410 from another network location. The retrieval process 2410 may check the web page for new content, and extract images that are newly uploaded. As an alternative, a schedule input 2414 may be used to implement the retrieval process programmatically on remote web pages.

The result of the retrieval process 2410 may correspond to image files 2416 that are inactive or unprocessed. The image files 2416 may be subjected to an image classification process 2420. In general, the image classification process seeks objects in images that are of a particular kind or type. For example, in one implementation, image classification process 2420 seeks items for which corresponding merchandise is provided, such as apparel, clothing and jewelry.

According to one embodiment, image classification process 2420 determines some initial information about the image as a whole in order to determine (i) whether the image file 2416 is a good candidate for enabling active portions, and/or (ii) objects of interest that are candidates or otherwise likely to be in the image The image classification process 2420 recognizes that images on web pages are often candid, or freeform in nature. Such images are typical in various news and celebrity websites. Such images often do not follow rules of convention, as present normally in, for example, e-commerce content items. For example, some images may be close-ups of persons or portions of persons (e.g. stomach of a celebrity), others images may be of a celebrity from far away, another image may contain a body part like a hand or foot. Some images are bad candidates for activation. For example, a person may be occluded by objects that are not of interest, or the perspective of the image may be such that no data is usable on the image.

In an embodiment, classification of the image file determines the perspective, and whether the image contains a person or a portion of a person. If a person is in the image, the classification of the image may determine what portion of the person is of focus in the image. In order to determine perspective and whether a person is in the image, a programmatic process may scan pixels or image elements for features that are markers. In one embodiment, markers correspond to the face of the person, as identified by, for example, eye brows, the eyes, the corner of a persons mouth, the lip shape, the tip of the nose, a person's teeth or hairline, a persons thumb or finger nail (for hand-shots in particular) or a person's toes, ankles or toe nails (for a foot shot). Different markers may be identified with different levels of certainty. See priority application U.S. patent application Ser. No. 11/246,742, entitled SYSTEM AND METHOD FOR ENABLING THE USE OF CAPTURED IMAGES THROUGH RECOGNITION, which is incorporated by reference herein. Once one marker is located, the presence of another marker may confirm the determination that both markers are present. For example, if a person's eyes are present, a program may then estimate, from the size of the region where the eyes are, a position of the eye brows, nose tip or mouth corner.

Once the person is identified, an embodiment provides that a candidate set of clothing or apparel is identified, corresponding to what clothing are apparel may reasonably be expected to be present in the image. For example, a headshot of a person may result in the determination that the image of the person may contain a hat, or a shirt, but that there will be no shoes or pants in the image.

As part of the image classification process, images that are poor candidates for activating portions are identified and marked to not be analyzed. These images may correspond to cases where there is blurriness, occlusion of objects or issues of perspective or angle of viewpoint of the image.

The object classification process 2420 may also use other information or clues on the page to determine the nature of individual images on the page. For example, text caption accompanying an image may be analyzed to determine whether the image contains male, female or both. Female persons in images may restrict the classification of apparel or clothing to that of women's wear. Other clues may be based on the web page itself (e.g. web page with known female audience). In one embodiment, the object classification process 2420 may be performed by object exterminator 140.

A process 2430 analyzes the image to determine what apparel or clothing is present ("apparel identification process 2430"). The analysis may be performed to determine if the pixels or image data reflect the presence of apparel or clothing that is one of the candidates identified from process 2420. In an embodiment, the markers are used to estimate the possible location of an apparel or clothing from the candidate set. The estimated position may reflect the size of the image, and the size and/or posture of the person in the image. Based on the position estimate, the image analysis may determined, for example, color values of pixels or image elements at the region to determine a color or pattern that is consistent with the existence of the candidate item of clothing or apparel. Once such a point is found, the image analysis may scan in a direction that is towards, for example, the markers of the person's face. A transition into a color that is known to be in the range of skin may reflect a boundary of the clothing or apparel. The boundary may be followed to determine a perimeter of the identified clothing or apparel.

Other apparel from the candidate set may be determined in similar fashion. For example, the marker may be of a person's face, and the location, size and position of the marker relative to the remainder of the image may reflect that the person is standing up. The analysis process 2430 may then anticipate that a certain region of the image contains pants, shorts, or even underwear. Then the apparel identification process 2430 inspects color and/or patterns to identify boundaries.

According to an embodiment, one result of the apparel identification process 2430 is that features or characteristics of detected objects of interest are determined and extracted, or otherwise segmented away from the remainder of the image. As such, the process 2430 may be performed by one or more modules of segmentation and/or feature extraction, such as described with an embodiment of FIG. 1. The features or shapes may be used to identify the apparel or clothing, as well as the attributes of the apparel or clothing. For example, the shape of a determined object may match a pair of pants. Additional attributes that are descriptive of the pants include whether the pants or baggy or tight, and the color of the pants.

In one embodiment, a result of the process 2430 is that (i) an apparel, item of clothing or other object of interest that is determined to be contained in the image is identified ("apparel identifier 2432"), and/or (ii) features or characteristics (e.g. color, how the item fits) of the item are determined and extracted ("feature 2434"). In one embodiment, the identification of the apparel or its features is stored with the page, or otherwise in association with the image. Extracted features may be performed and correspond to any feature extraction process such as described with FIG. 1 or FIG. 7-10. The apparel identifier 2432 may be class-specific, and performed with segmentizer 110 (FIG. 1) in combination with object determinator 140 (FIG. 1).

Features 2434 may be in the form of text ("handbag, brown"), numeric or image-based (similarity determined handbag that is highly processed). For example, in one embodiment, an image signature of the identified object (i.e. clothing or apparel) is determined. The image signature may correspond to a vector representation of the image.

In addition or as an alternative to the image signature, one or more embodiments provide that a similarity image is pre-associated with the identified clothing or apparel of interest. The similarity image may be one that has been processed in a library or collection of images (e.g. e-commerce library). The similarity image may substitute for the identified object or apparel in the event the identified apparel/clothing is subsequently specified for a visual search. For example, if the process 2430 determines that an image of a person contains a shirt of a particular pattern, a matching or similar image from a known and processed library of images is identified. If a viewer of a page subsequently wants to do a search that specifies, for example, a pair of pants worn by an athlete, the visual search may be performed on a different, but similar pair of pants, where the image used to perform the search is highly processed.

An activation process 2440 may then activate portions of select images on the web page. The activation process may encode or embed script with the source of the web page so that an identified object of interest from an image (e.g. pants of a picture of a person) is active. The active portion of any image may be used for a subsequent visual search.

While an embodiment of FIG. 24 provides for a series of programmatic processes, one or more embodiments contemplate use of a manual process as a substitute. In one embodiment, processes of apparel identification 2430, for example, may be manually performed.

As an addition or alternative embodiment, manual processes may be performed to enrich or enhance one or more programmatic embodiments described. For example, the results of the apparel identification may be presented to an editor for manual confirmation.

Furthermore, while embodiments described herein and elsewhere provide for searching for visual characteristics of a query item to identify other items of the same class, an embodiment such as described with FIG. 23 or FIG. 24 contemplate cross-category searching. For example, if the search criteria corresponds to a shirt, the visual characteristics of the shirt may be used to also identify one or more items of apparel that match.

It is contemplated for embodiments of the invention to extend to individual elements and concepts described herein, independently of other concepts, ideas or system, as well as for embodiments to include combinations of elements recited anywhere in this application. Although illustrative embodiments of the invention have been described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mentioned of the particular feature. Thus, the absence of describing combinations should not preclude the inventor from claiming rights to such combinations.

What is claimed is:

1. A method for processing images, the method comprising:

using one or more processors to perform steps comprising:

analyzing an image provided at a third-party website in connection with displaying concurrently one or more other images at the third-party website that satisfy a search criterion generated from analyzing the image, wherein analyzing the image includes:

programmatically analyzing the image to determine one or more visual characteristics of at least one object in the image;

generate a search criterion based at least in part on the one or more visual characteristics of the at least one object;

performing a search of a data store using the search criterion in order to obtain a search result that includes one or more images of merchandise objects that satisfy the search criterion; and presenting the one or more images of merchandise objects with the analyzed image at the third-party website;

wherein programmatically analyzing the image further comprises determining one or more categories of the at least one object of the analyzed image based at least in part on (i) text and/or metadata associated with the image; and (ii) a reference record assigned to each of the one or more categories that identifies words or phrases and their respective weights for use in determining that the one or more categories are relevant to the analyzed image;

wherein performing the search further comprises identifying at least one image of a merchandise object that (i) is deemed similar to the at least one object of the analyzed image, but (ii) is in a different category than the at least one object of the analyzed image.

2. The method of claim 1, wherein determining one or more categories of the at least one object includes using text and/or metadata associated with the image to determine the one or more categories.

3. The method of claim 1, further comprising segmenting the analyzed image to cause the at least one object of the analyzed image to be segmented apart from a remainder of the analyzed image so as to be selectable by a user to generate said search criterion corresponding to the selected object.

4. The method of claim 1, wherein the third-party website corresponds to a blog.

5. The method of claim 1, wherein the one or more visual characteristics of the analyzed image include a global feature.

6. The method of claim 1, wherein the one or more visual characteristics of the analyzed image include a local feature.

7. The method of claim 1, wherein the one or more visual characteristics of the analyzed image include (i) a global color of the at least one object, or (ii) a localized color of a portion of the at least one object.

8. The method of claim 1, wherein the one or more visual characteristics of the analyzed image include a texture, a pattern, or a shape of the at least one object.

9. The method of claim 1, wherein programmatically analyzing the image includes programmatically determining information about the at least one object of the image by analyzing metadata associated with the images.

10. The method of claim 1, wherein the text and/or metadata is indicative of a source from which the at least one object of the image is provided.

11. The method of claim 1, wherein the text and/or metadata associates gender or demographic information with a source that displays the image that is analyzed.

12. The system of claim 1, wherein the text and/or metadata is indicative of a source from which the at least one object of the image is provided.

13. The system of claim 1, wherein the text and/or metadata associates gender or demographic information with a source that displays the image that is analyzed.

14. A system for processing images for analysis and search, the system comprising:

a component to procure one or more images from a third-party website;

an image analysis subsystem that is configured to:

programmatically analyze at least one of the procured images to determine one or more visual characteristics of at least one object in the image;

determine one or more categories of the at least one object of the analyzed image based at least in part on (i) text and/or metadata associated with the image; and (ii) a reference record assigned to each of the one or more categories that identifies words or phrases and their respective weights for use in determining that the one or more categories are relevant to the analyzed image;

generate one or more search criteria from the one or more visual characteristics of the at least one object;

search the data store using the one or more search criteria to identify one or more images of merchandise objects that satisfy the one or more search criteria, including identifying at least one image of a merchandise object that (i) is deemed similar to the at least one object of the analyzed image, but (ii) is in a different category than the at least one object;

a presentation module configured to present the identified one or more images of merchandise objects with the analyzed image of the at least one object, including to present the image of the merchandise object that is of the different category than the at least one object of the analyzed image.

15. The system of claim 14, further comprising a segmentation module configured to segment the analyzed image so as to make the at least one object selectable separate from a remaining portion of that image.

16. The system of claim 15, wherein the image analysis subsystem is configured to determine a category of the at least one object of the analyzed image by using text and/or metadata that is provided or associated with the analyzed image to categorize the at least one object.

17. The system of claim 16, wherein the image analysis subsystem further includes an extraction component to extract one or more features from the at least one object of the analyzed image.

18. The system of claim 17, wherein the one or more features correspond to one or more of (i) a global color of the at least one object, or (ii) a localized color of a portion of the at least one object.

* * * * *